(12) United States Patent
Park

(10) Patent No.: US 10,098,190 B2
(45) Date of Patent: Oct. 9, 2018

(54) MICROWAVEABLE VESSEL

(71) Applicant: Jong Peter Park, Pasadena, CA (US)

(72) Inventor: Jong Peter Park, Pasadena, CA (US)

( * ) Notice: Subject to any disclaimer, the term of this patent is extended or adjusted under 35 U.S.C. 154(b) by 436 days.

(21) Appl. No.: 14/628,282

(22) Filed: Feb. 22, 2015

(65) Prior Publication Data

US 2015/0282258 A1    Oct. 1, 2015

Related U.S. Application Data

(63) Continuation-in-part of application No. 13/681,071, filed on Nov. 19, 2012, now Pat. No. 9,119,233, which is a continuation-in-part of application No. 12/938,681, filed on Nov. 3, 2010, now Pat. No. 8,387,820.

(60) Provisional application No. 62/072,993, filed on Oct. 30, 2014, provisional application No. 62/022,163, filed on Jul. 8, 2014.

(30) Foreign Application Priority Data

Oct. 7, 2010    (KR) .......................... 10-2010-0097769

(51) Int. Cl.
```
H05B 6/64      (2006.01)
H05B 6/80      (2006.01)
B65D 1/20      (2006.01)
A47J 36/02     (2006.01)
```

(52) U.S. Cl.
CPC .......... *H05B 6/6494* (2013.01); *A47J 36/027* (2013.01); *H05B 6/6408* (2013.01)

(58) Field of Classification Search
CPC ..... H05B 6/6494; H05B 6/6408; A47J 36/027

USPC ....... 219/725, 730, 732, 620, 687, 759, 762, 219/731; 220/573.1, 710.5, 714; 99/342, 99/403; 126/375.1, 400

See application file for complete search history.

(56) References Cited

U.S. PATENT DOCUMENTS

| | | | | |
|---|---|---|---|---|
| 5,520,103 A | * | 5/1996 | Zielinski | A47J 41/0044 126/246 |
| 5,889,069 A | * | 3/1999 | Suh | C08J 9/0061 521/138 |
| 2004/0118838 A1 | * | 6/2004 | Park | A47J 36/027 219/725 |
| 2007/0068936 A1 | * | 3/2007 | Wu | A47J 45/068 219/687 |
| 2012/0037617 A1 | * | 2/2012 | Kim | H05B 6/6408 219/725 |

FOREIGN PATENT DOCUMENTS

| | | | | | |
|---|---|---|---|---|---|
| JP | 2004340379 A | * | 12/2004 | | F16K 31/04 |
| JP | 2005075697 A | * | 3/2005 | | |
| WO | WO 2010093068 A1 | * | 8/2010 | | H05B 6/6408 |

* cited by examiner

*Primary Examiner* — Quang Van

(57) ABSTRACT

Some embodiments provide a microwaveable vessel that can quickly and evenly heat or cook different types of food. In some embodiments, the vessel includes a metallic body adapted to hold food or drinks. The outer portion of the body is coated with a layer of heat-generating glaze. In some embodiments, the vessel also includes a heat-resistant outer cover that covers the heat-generation layer. The vessel of some embodiments has a multi-layered structure with inner and outer shells that are joined together to form a cavity between the shells.

17 Claims, 21 Drawing Sheets

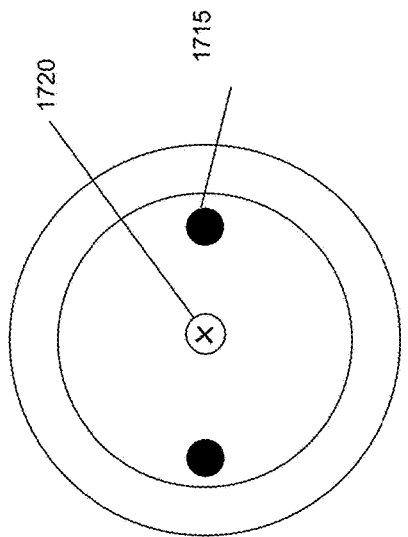
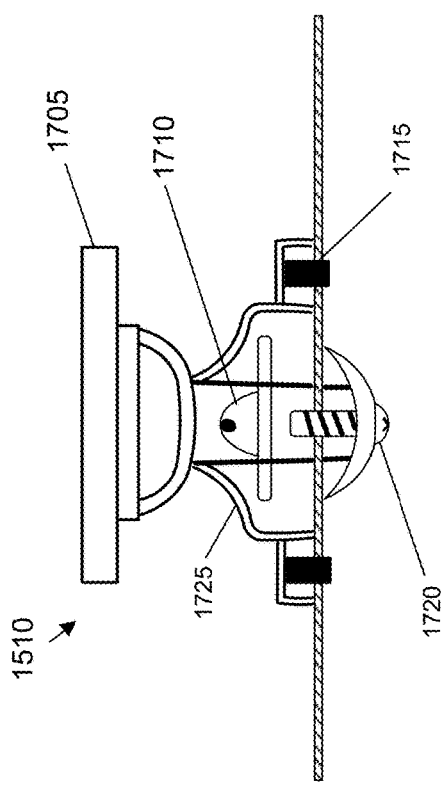
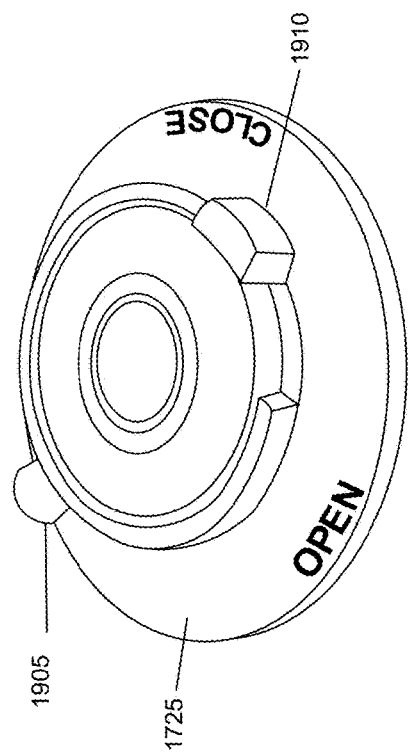

MICROWAVEABLE VESSEL

CLAIM OF BENEFIT TO PRIOR APPLICATIONS

This application claims the benefit of U.S. Provisional Patent Application 62/072,993, filed on Oct. 30, 2014. This application is also a continuation in part application of U.S. patent application Ser. No. 13/681,071, filed on Nov. 19, 2012 and published as U.S. Patent Application Publication 2014013837. U.S. patent application Ser. No. 13/681,071 is a continuation in part application of U.S. patent application Ser. No. 12/938,681, filed on Nov. 3, 2010 and issued as U.S. Pat. No. 8,387,820. This application claims the benefit of U.S. Provisional Patent Application 62/022,163, filed on Jul. 8, 2014. U.S. Patent Application 62/072,993, U.S. Patent Application Publication 2014013837, and U.S. Pat. No. 8,387,820 are incorporated herein by reference.

BACKGROUND

A microwave oven is a very popular appliance that is available in various different places. A person can use it from nearly anywhere (e.g., at home, at work, at the store, etc.). One of the primary reasons for its popularity is because it can conveniently and safely heat food, including beverages. The microwave oven heats food by bombarding it with electromagnetic radiation in the microwave spectrum causing polarized molecules in the food's water content to oscillate back and forth, and thereby generate thermal energy. This microwave cooking process is also known as dielectric heating.

Despite its popularity, the microwave oven or, more specifically, microwave cooking has a number of problems. For instance, microwave cooking can result in food becoming dry, or partially or unevenly heated. In addition, the cooking time can be very long, and the food can lose its original taste after being heated in the microwave oven. The main cause of these problems is due to how the microwave oven heats food through oscillation.

Furthermore, it is commonly advised to avoid placing metal containers in a microwave oven because the electromagnetic waves cannot pass through the metal, unlike glass, plastic, and paper. This is one of the reasons why a person should not put a typical thermos into a microwave oven. There is also the possibility that the oscillation of the electromagnetic waves may produce a concentrated electric field at the edge of the metal object. If that edge is in close proximity with another metallic object, sparks may appear between the two objects because of that concentration.

Accordingly, there is a need for a microwaveable vessel that can quickly and evenly heat or cook different types of food. There is also a need for a microwaveable vessel that, similar to a thermos, can greatly lengthen the time over which its contents remain heated.

BRIEF SUMMARY

Embodiments described herein provide a microwaveable vessel that can quickly and evenly heat or cook different types of food, including beverages. In some embodiments, the microwaveable vessel can greatly lengthen the time over which its contents remain heated. The microwaveable vessel may be a cooking vessel such a pan, a pot, a bake ware, etc. The vessel may be a cup or a mug (e.g., a travel mug, a coffee mug, etc.).

In some embodiments, the microwaveable vessel has a metallic body adapted to hold food or drinks. The body has a bottom side, and one or more side walls that extend upwardly from the bottom side to form a receptacle. The outer portion (e.g., outer surface) of the body is (e.g., completely) coated with a layer of heat-generating glaze. In some embodiments, the vessel also includes a heat-resistant outer layer (e.g., thermal insulator) or cover that covers the heat-generation layer.

The heat-generating glaze of some embodiments absorbs electromagnetic waves from the microwave oven's magnetron and converts them into thermal energy through oscillation. The thermal energy is then transferred to the metallic body, which causes the contents of the vessel to be evenly heated from all sides of the vessel, including its side wall(s) and bottom side. In some embodiments, the heat-generating glaze is an exothermic enamel glaze or exothermic ceramic glaze that has manganese-zinc ferrite and/or ferrosilicon. In some embodiments, the exothermic ceramic glaze is a mixed metal alloy powder compound comprising ferrite, silicon (Si), and aluminum (Al).

As mentioned above, the vessel of some embodiments includes a heat-resistant outer layer (e.g., thermal insulation layer) or cover that covers the heat-generation layer. In some embodiments, the heat-resistant outer layer serves multiple purposes. The heat-resistant outer layer may insulate the vessel by trapping heat. The heat-resistant outer layer may make the vessel safe to touch when heated. Different embodiments use different materials for the heat-resistant outer layer. In some embodiments, the heat-resistant layer is composed of polystyrene such as syndiotactic polystyrene (SPS). In some embodiments, the heat-resistant layer is composed of a polymer such polyphenylene sulfide (PPS). The vessel of some embodiments uses such a polystyrene or polymer because it has heat resistance up to and excess of 260° C. The PPS may be an exothermic PPS that has exothermic particles.

To retain heat for an extended period of time, the microwaveable vessel of some embodiments includes a multi-layered (e.g., double-layered) wall structure with inner and outer shells. In some embodiments, the inner shell is configured to form a receptacle having a bottom side that extends upwardly to form a wall of the inner shell and terminates at a top of the inner shell. The outer shell is configured to substantially surround the inner shell, and has a bottom side that extends upwardly to form a wall of the outer shell and terminates at a top of the outer shell.

The inner and outer shells form a pocket of space (i.e., a cavity) to hold a heat-conduction or heat-retention medium. Specifically, an inner space is formed between the inner and outer shells of the microwaveable vessel. In some embodiments, the inner space of the vessel is at least partially filled with air (e.g., ambient air). In some embodiments, the inner space is at least partially filled with an oil-based medium such as silicone oil. In some embodiments, the inner space is at least partially filled with carbon fiber. In some embodiments, the inner space includes a thermal conductive pad or a thermal conductive gel. In some embodiments, the inner space includes silicone-based material that is mixed with an aluminum oxide compound. In some embodiments, the inner space includes silicone rubber with ferrite particles (e.g., manganese zinc (MnZn) ferrite particles).

In some embodiments, the outer surface of the outer shell is coated with the heat-generating glaze mentioned above to enhance exothermic performance. In conjunction with the exothermic glaze, or instead of it, the microwaveable vessel of some embodiments includes an exothermic plate. Similar to the glaze, the exothermic plate coverts microwave radiation to thermal energy. The exothermic plate may be affixed to the bottom side of the microwaveable vessel. In some embodiments, the exothermic plate is disposed between the bottom portions of the inner and outer shells, and exposed along the bottom side of the outer shell to absorb microwaves and convert the microwaves to heat. In some embodiments, the exothermic plate is composed of a far-infrared emitting heating material. The exothermic plate of some embodiments is composed at least partially of ceramic. An example of a ceramic exothermic plate is called pyrogen.

Accordingly, the vessel of some embodiments has a multi-layered (e.g., double-layered) wall structure and a far-infrared emitting heating material is inserted therein at the bottom. In some embodiments, the microwaveable vessel is especially suitable for a mug to contain a beverage (e.g., coffee or tea) that can be heated in a microwave oven. In some embodiments, the microwaveable vessel can be used in a similar manner as a thermos to keep its content heated for an extended period of time. Different from the thermos, the vessel can be used with a microwave oven. With the double-layered wall structure, the microwaveable vessel of some embodiments prevents rapid temperature increase (e.g., to one specific area) or uneven heat distribution in a microwave oven, and thus, heat is evenly distributed throughout the whole content of the microwaveable vessel.

As mentioned above, in some embodiments, there is an opening at the bottom of the outer shell and the heating element (e.g., the exothermic ceramic plate) is inserted in or placed in between the inner and outer shells such that it is exposed through the opening. When the microwave oven is operating, microwaves can heat up the heating material up to or in excess of 250° C. (550 F) in just 1-2 minutes, then forming a hot air layer between the walls of the inner shell and the outer shell. Accordingly, the temperature inside the microwaveable vessel increases slowly and steadily. Even after the heating by microwaves is finished, the heat-conduction medium (e.g., hot air layer, silicone oil) and the heated heating material can play the role of thermal energy source to the content of the microwaveable vessel so that high temperature can be maintained for an extended period of time. The present invention is especially excellent in distributing heat evenly and throughout the whole content of the microwaveable vessel. This is not possible with conventional microwaveable vessels such as a microwavable pan, mug, etc.

Generally, it takes very long time to cook using a microwave oven, and the taste of food can be lost during microwave cooking. However, the microwaveable vessel of some embodiments preserves the taste of food by preventing the microwaves from drying the food. The vessel of some embodiments is especially suitable for a travel mug. Coffee or tea in a mug cools down rapidly during travel or commute, but the travel mug of the present invention can be heated up in a microwave oven so that the coffer therein can be heated up to 80-85° C., which represents an optimal temperature range to serve coffee. In addition, with the double-layered wall structure, the heat in the microwaveable vessel can be maintained a very long time similar to a thermos.

In some embodiments, the inner surface of the inner shell of the microwaveable vessel is coated with copper or silver, which is conductive so that the heat can be quickly transferred to the content of the microwaveable vessel. Also, in some embodiments, the heat-conduction medium (e.g., air, silicone oil) between the inner shell and the outer shell remains heated for a long time. Thus, the microwaveable vessel of some embodiments can perform the same function as a slow cooker, a thermal cooker, and even a thermos.

In some embodiments, the vessel is a multi-purpose vessel that can heat its contents with different appliances and not just the microwave oven. In some embodiments, the multi-purpose vessel is adapted to heat its content on a gas stove, an electric stove, and an induction cooker. That is, the microwaveable vessel of some embodiments is suitable for heating by microwave oven, stovetop, and induction cooking.

Accordingly, some embodiments provide a microwaveable vessel that can quickly and evenly heat or cook different types of food. The vessel of some embodiments has an inner shell, an outer shell, and a heating element therebetween at the bottom. The heating element is capable of being heated up to or in excess of 250° C. (550 F) in just 1-2 minutes, then forming a heat-conduction layer (e.g., hot air layer) between the walls of the inner shell and the outer shell. The layer provides thermal energy to the contents of the microwaveable vessel and the heat of the heating element can be directly transferred to the contents of the microwaveable vessel through the bottom of the inner shell from the heated heating element. The bottom of the outer shell is open so that the bottom of the heating element can be exposed in order for the microwave to heat up the heating element. In some embodiments, the heating element is made of a far-infrared emitting ceramic.

In some embodiments, the microwaveable vessel has an inner shell, an outer shell, and a heating element attached to the bottom of the outer shell. The heating element is covered with a ferrite or ferrite rubber and a set of vent holes is formed on the bottom surface of the ferrite. In addition, there is an open area at the bottom of the outer shell. In some embodiments, the microwaveable vessel has an inner shell, an outer shell, and a heating element. The heating element is covered with a top shell and a bottom shell, or housed in a single housing (e.g., cap housing). The bottom shell or the housing is open to expose the bottom of the heating element. The outer shell, the bottom shell, and the top shell are welded together using a particular welding technique (e.g., argon arc welding).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 17 provides a cross sectional view of a lid handle according to some embodiments.

FIG. 18 shows a bottom view of the handle according to some embodiments.

FIG. 19 shows a lid handle with a pressure release switch.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a microwaveable vessel that can quickly and evenly heat or cook different types of food, including beverages. In some embodiments, the microwaveable vessel, like a thermos, can greatly lengthen the time over which its contents remain heated. The microwaveable vessel may be a cooking vessel such a pan, a pot, a bake ware, etc. The vessel may be a cup or a mug (e.g., a travel mug, a coffee mug, etc.). To simplify the description, the microwaveable vessel may also be referred to herein as a cooking vessel.

Figure 1:
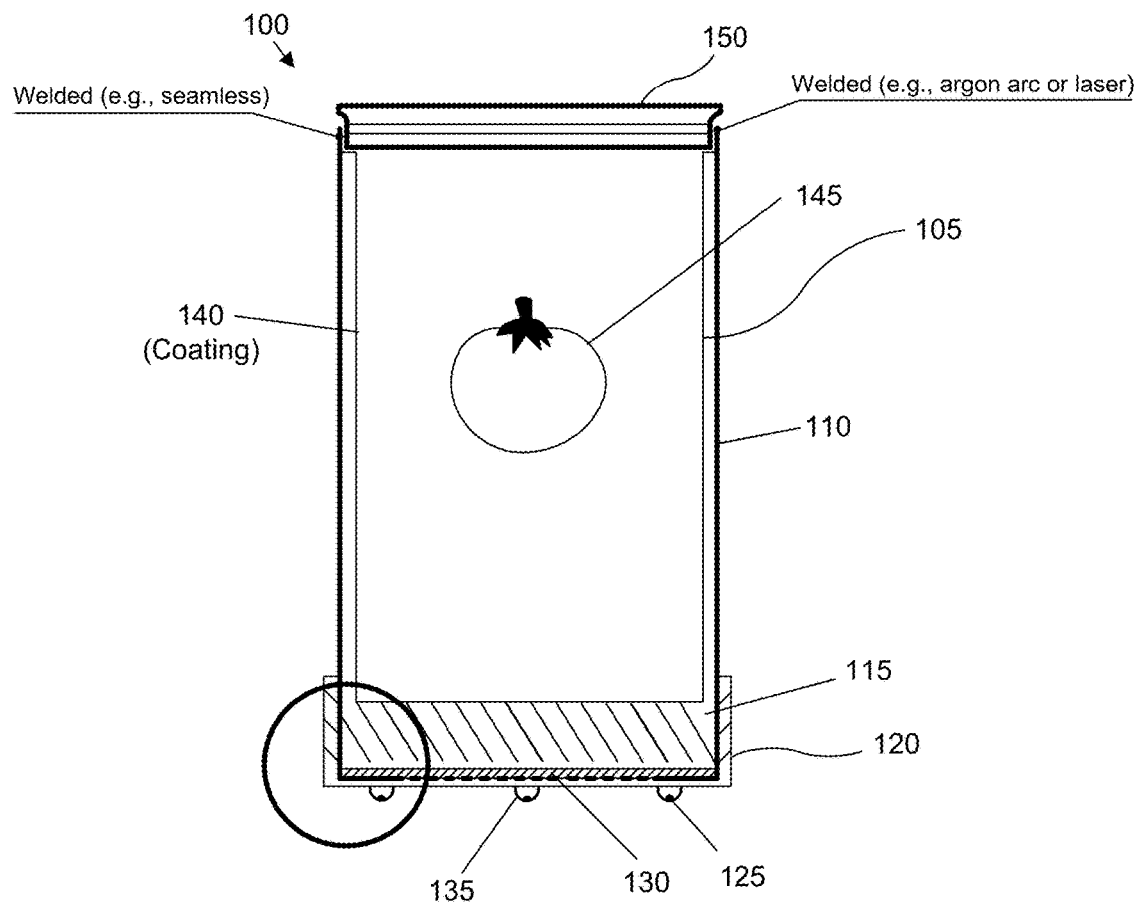
FIG. 1 shows a cross-sectional view of a cooking vessel according to some embodiments of the invention.
Figure 5:
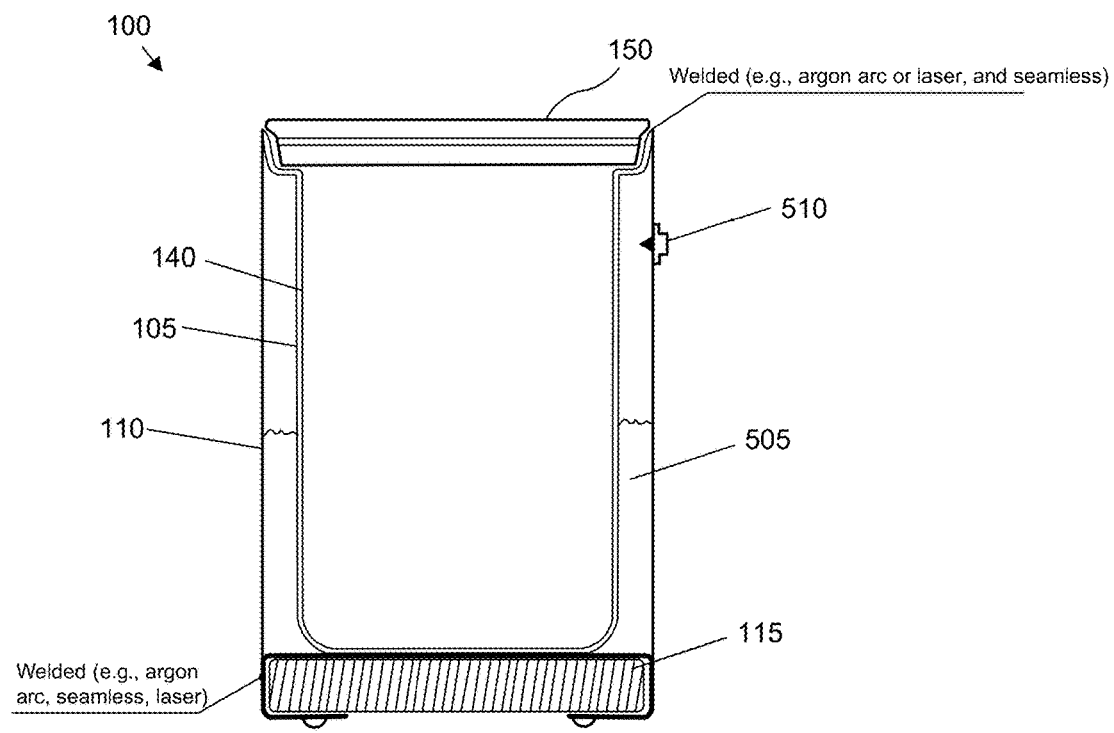
FIG. 5 shows a cross-sectional view of another cooking vessel according to some embodiments of the invention.

FIG. 1 shows a cross-sectional view of the cooking vessel according some embodiments. The cooking vessel 100 may be a pot, a pan, a bake ware, a mug or a travel mug, suitable for heating by microwave oven, stove top and/or induction cooking. In some embodiments, the cooking vessel 100 of FIG. 1 is especially suitable for a microwavable mug, whereas the cooking vessel 100 of FIG. 5 is suitable for microwave oven, stovetop, and induction cooking Typically, a mug is used to consume (e.g., drink) hot beverages, such as coffee, tea, hot chocolate, soup, etc.

The cooking vessel 100 of some embodiments has an inner shell 105 and an outer shell 110 as in FIG. 1. The inner shell 105, configured to form a container or receptacle, has a bottom that extends upwardly to form a wall and terminates at a top of the inner shell. The outer shell 110, which is formed to substantially surround the inner shell 105, has a bottom extends upwardly to form a wall of the outer shell and terminate at a top of the outer shell.

In some embodiments, the inner shell 105 and the outer shell 110 are made of stainless steel. In some embodiments, the shells are made of a certain type of stainless steel (e.g., as AISI 304). In some embodiments, the stainless steel is used instead of a non-stick coated metal because it does contaminate the food items with the non-stick coat particles when heated above a certain threshold temperature. At the bottom of the shells (e.g., between the inner shell 105 and the outer shell 110), there is a heating element 115 adapted to convert microwave radiation into thermal energy. In some embodiments, the vessel 100 includes a pressure-releasing member to prevent the two shells from separating with the expansion of the pocket of air between them. Several examples of such a pressure-releasing member are described below by reference to FIGS. 9-11.

The heating element 115 of some embodiments is capable of being heated up to or in excess of 250° C. (550 F) in just a few minutes (e.g., 1-2 minutes) in a microwave oven. In some embodiments, this forms a hot air layer between the walls of the inner shell 105 and the outer shell 110. The hot air layer provides thermal energy (e.g., a long-lasting thermal energy source) to the contents of the cooking vessel 100. In some embodiments, the inner space is at least partially filled with a heat-retention medium such as silicone oil. In some embodiments, the inner space is at least partially filled with carbon fiber. In some embodiments, the inner space includes a thermal conductive pad or a thermal conductive gel. In some embodiments, the inner space includes silicone-based material that is mixed with an aluminum oxide compound. In some embodiments, the inner space includes silicone rubber with ferrite particles (e.g., manganese zinc (MnZn) ferrite particles).

In some embodiments, the heating element 115 is attached to or in touch with the bottom of the inner shell 105 so that the heat of the heating element can be directly transferred to the contents of the cooking vessel 100 from the bottom. In the example of FIG. 1, the bottom of the outer shell 110 has an opening so that the bottom of the heating element 115 can be exposed in order for the microwave oven to heat up the heating element 115. This structure prevents electrostatic phenomena but helps efficient transfer of heat to the heating element 115.

The heating element 115 may be made of any material that can be quickly heated with a microwave oven. In some embodiments, the heating element 115 is an exothermic plate adapted to absorb electromagnetic radiation and generate heat. In some embodiments, the heating element includes ceramic. In some embodiments, the heating element is made of a far-infrared emitting ceramic. In some embodiments, the heating element 115 includes conductive graphite and/or conductive carbon. As shown, the heating element 115 of some embodiments is in contact with the bottom of the inner shell 105.

The heating element 115 may act as a thermal blanket. Besides generating thermal energy and transferring that energy to the cooking vessel 100, the heating element 115 may protect the cooking vessel 100 from rapid heat loss. Once heated, the heating element 115 remains heated for a substantial period of time, even after the microwave oven is turned off.

In some embodiments, the outer surface of the outer shell 110 may be coated with an exothermic enamel glaze or exothermic ceramic glaze. The exothermic enamel glaze or exothermic ceramic glaze may include manganese-zinc ferrite and ferrosilicon to help microwave energy penetrate inside. In some embodiments, the outer surface of the outer shell 110 is coated by spray coating a mixture of manganese-zinc ferrite and ferrosilicon to improve exothermic conductivity of the outer surface of the outer shell 110. In some embodiments, the exothermic ceramic glaze is a mixed metal alloy powder compound comprising ferrite, silicon (Si), and aluminum (Al).

The bottom and the lower parts of the vessel wall is covered with a heat resistant member 120 in order to prevent the loss of heat stored in the heating element 115. The heat resistance member 120 may be made of heat resistance silicone. The vessel 100 of FIG. 1 of some embodiments is only suitable for a microwave oven. This is because the heat-resistant member 120 covers the bottom portion of the vessel. Several examples of different multi-purpose vessels that are adapted to heat their contents with different appliances (e.g., microwave oven, induction cooker, stove top, etc.) will be described below by reference to FIGS. 5 and 6, and 13 and 14. Instead of the heat-resistant member, the cooking vessel of some embodiments is at least partially covered with a different material such as syndiotactic polystyrene (SPS), polyphenylene sulfide (PPS), or some other heat-resistant component or material. To enhance the exothermic properties of the vessel, the PPS of some embodiments includes exothermic particles.

Referring to FIG. 1, there is a vacuum 130 between the heating element 115 and the bottom of the heat resistant silicone 120 for the purpose of insulation. Once the heat-retention medium (e.g., silicone oil) is heated, it can remain heated for an extended period of time (e.g., 2 to 3 hours). The heating element 115 may be raised or supported using supporting members 205. In some embodiments, the supporting members are formed on the bottom of the outer shell 110. The vacuum 130 may be formed in the area surrounded by the heating element 115, the supporting member 205 (shown in FIG. 2) and the heat resistant silicone 120.

In some embodiments, the two shells are welded together. In some embodiments, the two shells are welded together using a set of one or more welding techniques. Some embodiments use the set of welding techniques to completely seal any space between the top portions (e.g., the top edges of the inner and outer shells) and prevent leakage of the heat conduction medium (e.g., the hot air, silicone oil). In some embodiments, the top ends of the inner shell 105 and the outer shell 110 are welded together by a seamless welding first and then finished by an argon arc welding at the end. This welding structure prevents separation of or explosion at the seam of the inner shell 105 and the outer shell 110. Instead of the seamless welding, a laser welding may be used. The seamless welding, the laser welding, and/or argon arc welding may be done to the shells 105 and 110 for about certain millimeters (mm). For instance, about 0.3 mm of the top edges of the two shells may be welded together (e.g., all around) using one or more of the different welding techniques enumerated above.

The cooking vessel 100 of some embodiments includes a lid 150. In some embodiments, the lid is made of metal (e.g., stainless steel). A metal-based lid is important because it reflects microwaves from the magnetron and thereby prevents the contents of the vessel from absorbing the microwaves. In some embodiments, the lid or the vessel includes a member (e.g., silicone ring, a packing) to prevent arcing (e.g., sparks from appearing between the edges of the lid and the vessel body). In some embodiment, the lid includes a silicone ring to substantially seal the receptacle when water boils within the inner chamber and thereby prevent heat dissipation. Inside of the inner shell 105 may be a coat 140 (e.g., including copper, silver, and/or some other material) to quickly distribute heat.

In some embodiments, the cooking vessel provides a visual indication of the temperature of its content. In some embodiments, at least portion of the outside of the outer shell 110 may be coated or painted with thermo-chromic paint or temperature indicator which can resist high temperature of the cooking vessel 100. The thermo-chromic paint changes in appearance to one or more different colors as the cooking vessel is heated and its temperature increases. As the vessel cools, the thermo-chromic paint returns to its one or more previous colors.

Thus, the thermo-chromic temperature indicator 145 is to indicate the temperature inside the cooking vessel 100. Another example of a temperature indicator will be described below by reference to FIG. 12. Different embodiments provide different visual indicator(s). For instance, some embodiments provide a lid with a temperature indicator (e.g., temperature gauge). An example of such a visual indicator will be described below by reference to FIG. 20.

Figure 2:
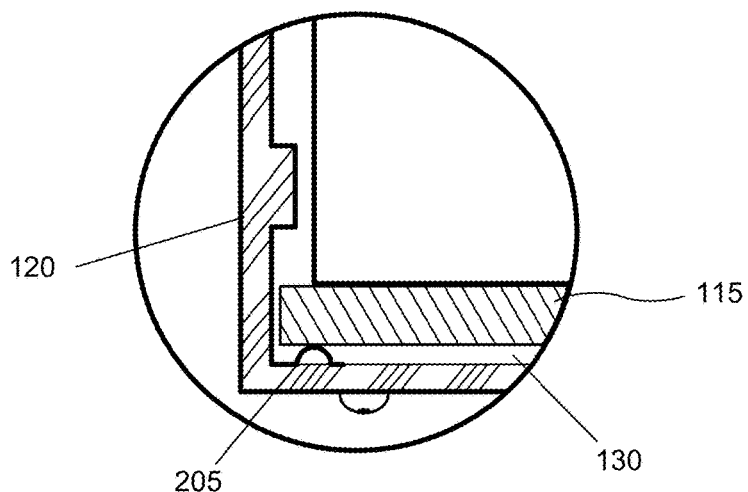
FIG. 2 shows a more detailed view of the bottom portion of the cooking vessel of FIG. 1.

FIG. 2 shows a more detailed view of the bottom portion of the cooking vessel of FIG. 1. Bottom supporting member 135 may be formed on the bottom of the heat resistant silicone 120 to support the cooking vessel 100, and a set of one or more vent holes 125 is formed at the bottom-supporting member 135 to prevent disfiguration of the bottom surface of the cooking vessel. Without the set of vent holes 125, the disfiguration may occur because of high thermal energy generated in the bottom of the cooking vessel 100. As shown FIG. 2, the heating element 115 may be supported or raised by a number of supporting members 205. In some embodiments, the supporting members 205 are formed on the bottom of the outer shell 110.

In some embodiments, the vacuum 130 is formed in the area surrounded by the heating element 115, the supporting member 205, and the heat resistant silicone 120. As mentioned above, the vacuum provides additional insulation along the bottom portion of the cooking vessel.

Figure 3:
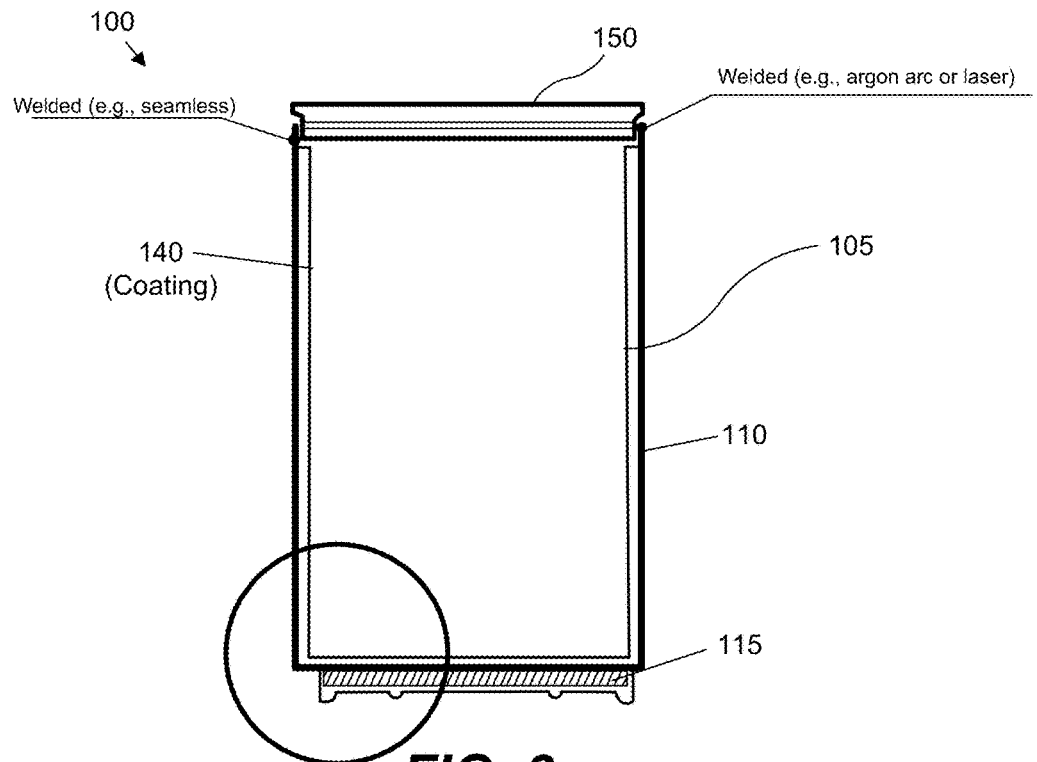
FIG. 3 shows a cross-sectional view of another cooking vessel according to some embodiments of the invention.

FIG. 3 shows a cross-sectional view of a cooking vessel according to some embodiments of the invention. Similar to FIG. 1, the vessel 100 has inner and outer shells (105 and 110). The top portions of the inner and outer shells may be welded together in some manner (e.g., via seamless, via seamless and argon, via seamless and laser, etc.). The vessel may include a lid 150, and the inner wall of the vessel may be coated with a coat (e.g., with copper, silver, etc.). Although not shown, the vessel 100 may also include a temperature indicator or at least partially painted with thermo-chromic paint. The vessel 100 may also include a pressure release mechanism or valve (e.g., silicone valve) to prevent the separation of the inner and outer shells. For instance, a pressure release value may be installed on the side of the outer shell to release any excess pressure built up in the cavity between the inner and outer shells when the container is heated. Pressure can be built up because the ambient air with moisture and/or the heat-retention medium can expand when the vessel is heated. As an example, during submersion in water, such as when being cleaned, or when placed in areas of high humidity, water and/or moisture may flow or collect within the inner chamber of the doubled layered vessel. After heating the double-layered cooking vessel, the moisture within the inner chamber is transformed into a vaporized state, i.e. steam. Consequently, the volume of the liquid or moisture, now in a vapor or gaseous state, is increased. Thus, the pressure release valve provides the means to decrease the volume by discharging the steam, thereby relieving stresses on the inner and outer shells of the vessel.

Different from FIG. 1, in the example of FIG. 3, the heating element 115 is not placed between the outer bottom surface of the inner shell 105 and the inner bottom surface of the outer shell 110. Rather, the heating element is attached or affixed to the bottom outer surface of the outer shell 110. In some embodiments, the heating element heats up the air between the inner shell 105 and the outer shell 110. In some embodiments, the heating element 115 is made of similar or the same material as the one described above by FIG. 1.

Figure 4:
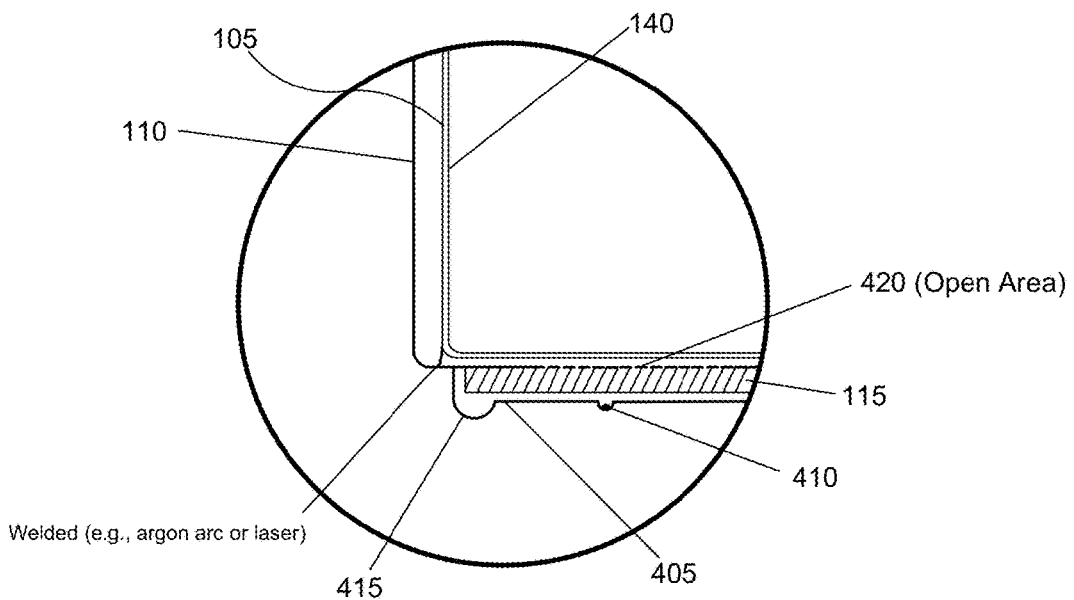
FIG. 4 shows a more detailed view of the bottom portion of the cooking vessel of FIG. 3.

FIG. 4 shows a more detailed view of the bottom portion of the cooking vessel of FIG. 3. In this example, the cooking vessel has multiple heating elements. Specifically, the heating element 115 is covered with another heating element such as a ferrite or ferrite rubber 405. The outer heating element 405 not only provides another heat source but also covers the inner heating element 115 to further insulate the bottom portion of the vessel. If the bottom portion of the vessel is covered with ferrite rubber, the vessel may only be suitable for a microwave oven.

In addition, bottom-supporting member 415 may be formed on the bottom of the heating element 405. Also, a set of one or more vent holes 410 is formed on the bottom surface of the ferrite 405. In some embodiments, there is an open area 420 (e.g., round open area) at the bottom of the outer shell 110. To prevent the heat-retention medium from leaking, the inner and outer shells may be welded at the bottom. In the example of FIG. 4, the bottom portions of the inner and outer shells (105 and 110) are welded together via argon arc or laser welding. However, a set of one or more different welding techniques can be used, in some embodiments.

The outer surface of the outer shell 110 may be coated with an exothermic enamel glaze or exothermic ceramic glaze. The exothermic enamel glaze or exothermic ceramic glaze may include manganese-zinc ferrite and ferrosilicon to help microwave energy penetrate inside. In some embodiments, the outer surface of the outer shell 110 is coated by spray coating a mixture of manganese-zinc ferrite and ferrosilicon to improve exothermic conductivity of the outer surface of the outer shell 110. In some embodiments, the exothermic ceramic glaze is a mixed compound (e.g., a compound mixture of metal alloy powder) comprising ferrite, silicon (Si), and aluminum (Al).

FIG. 5 shows a cross-sectional view of a cooking vessel according to some embodiments of the invention. Similar to FIGS. 1 and 3, the cooking vessel 100 includes an inner shell 105 and an outer shell 110. The inner shell 105, configured to form a container, has a bottom of the inner shell that extends upwardly to form a wall of the inner shell and terminates at a top of the inner shell. The outer shell 30, configured to substantially surround the wall of the inner shell, has a wall of the outer shell that terminating at a top of the outer shell. The inner wall of the inner shell may be coated with a coat (e.g., copper or silver). The top portion of the inner and outer shells may be welded together using one or more different welding techniques (e.g., seamless and argon arc or seamless and laser).

Different from FIGS. 1 and 3, the inner space between the inner shell 105 and the outer shell 110 is at least partially filled with a heat-retention medium. For instance, the cavity between the two shells may include silicone oil 505. The silicon oil improves insulation properties of the cooking vessel 100. For instance, once the silicone oil is heated with the microwave oven, it can remain heated for an extended period of time (e.g., 2 to 3 hours or even longer). In some embodiments, the inner space is at least partially filled with carbon fiber. In some embodiments, the inner space includes a thermal conductive pad or a thermal conductive gel. In some embodiments, the inner space includes silicone-based material that is mixed with an aluminum oxide compound. In some embodiments, the inner space includes silicone rubber with ferrite particles (e.g., manganese zinc (MnZn) ferrite particles).

To relieve or discharge high pressure generated by the heated heat-retention medium, the vessel includes an auto pressure relief valve 510. Also, there may be a pocket of air which can expand when heated, and the valve 510 prevents the two shells 105 and 110 from separating in case the heat-retention medium and/or the pocket of air expands when the vessel is heated.

Figure 6:
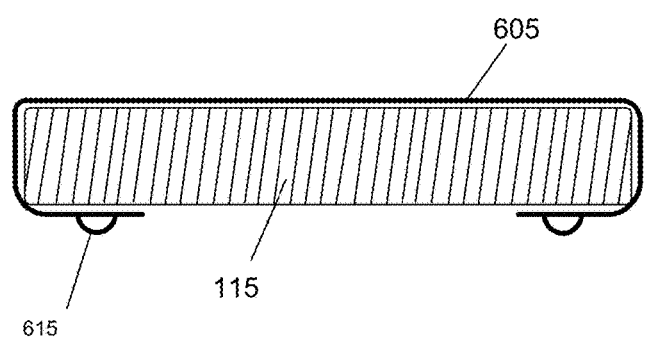
FIG. 6 shows a cross-sectional view of the bottom portion of the cooking vessel of FIG. 5.

FIG. 6 shows a cross-sectional view of the bottom portion of the cooking vessel of FIG. 5. In some embodiments, the vessel has a cap insert 605 that surrounds the heating element 115. The cap insert may be affixed or welded to the bottom of the inner shell and/or the outer shell. In some embodiments, the cap insert is a single piece of metal formed to house the heating element 115. The metal may be or include ferromagnetic metal that have magnetic properties. The ferromagnetic metal allows the vessel to heat food items on an induction cooker. The metal and the heating element can also be heated using a gas or electric stove. In some embodiments, the cap insert has a top shell and a bottom shell to house the heating element.

In some embodiments, the cap insert is made of stainless steel. In some embodiments, the cap insert is made of a certain grade of stainless steel. For instance, the cap insert can be made of stainless steel grade 430, which has magnetic properties, and is well known for its formability and resistance to corrosion. Accordingly, the example vessel of FIGS. 5 and 6 is a multi-purpose vessel that can operate in conjunction with different appliances, including a microwave over, a stove top, an induction cooker, etc.

The cap insert or housing may be fabricated using stainless steel. In some embodiments, the cap insert is fabricated using a certain grade of stainless steel. For instance, the cap insert may be made from stainless steel grade ANSI 430, which is well known for its corrosion resistance and formability. As the cap insert is made of stainless steel, the cooking vessel 100 can be heated with a stovetop (e.g., gas or electric) or an induction cooker. In some embodiments, the bottom of the inner shell 105 is attached to or in contact with the cap insert 605. In some embodiments where the cap insert includes top and bottom shells, the bottom shell holds the exothermic plate and the top shell covers the bottom plate.

In some embodiments, the cap insert has an opening to expose the bottom of the heating element 115. In some embodiments, the housing (e.g., the housing cap) includes a number of support members 615 to raise the cooking vessel. In some embodiments, the support members 615 are formed on or attached to the cap insert. To operate optimally with an induction cooker, the housing may not include any support members.

In some embodiments, the outer shell 110 and the cap insert 605 are welded together using one or more different welding techniques. In some embodiments, they are welded together using seamless welding, argon arc welding and/or laser welding. As shown in FIG. 5, the lower portion(s) or the lower edge(s) of the outer shell is welded to the cap housing. This prevents the heat-conduction medium (e.g., the silicone oil 595) from the leaking out the bottom portion of the vessel 100.

In some embodiments, the outer surface of the outer shell 110 may be coated with an exothermic enamel glaze or exothermic ceramic glaze. The exothermic enamel glaze or exothermic ceramic glaze may include manganese-zinc ferrite and ferrosilicon to help microwave energy penetrate inside. In some embodiments, the outer surface of the outer shell 110 is coated by spray coating a mixture of manganese-zinc ferrite and ferrosilicon to improve exothermic conductivity of the outer surface of the outer shell 110. In some embodiments, the exothermic ceramic glaze is a mixed metal alloy powder compound comprising ferrite, silicon (Si), and aluminum (Al).

Figure 7:
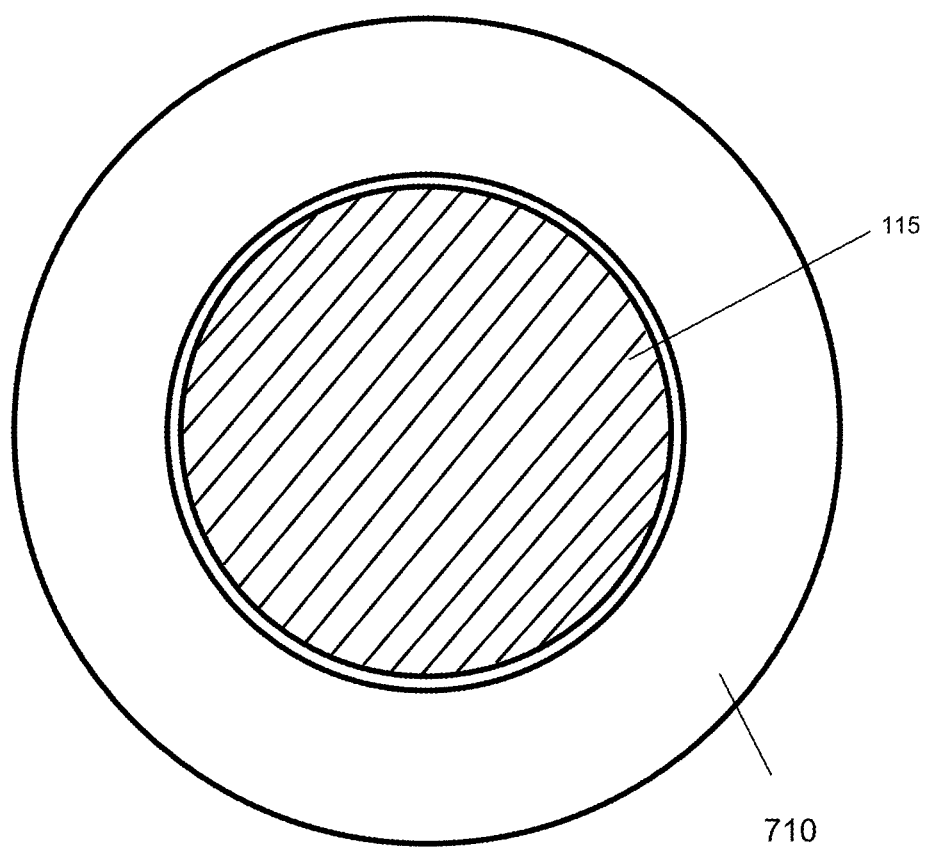
FIG. 7 shows a bottom view of the cooking vessel of FIG. 5.

FIG. 7 shows a bottom view of the cooking vessel of FIG. 5. The bottom of the heating element 115 is exposed through the (e.g., circular) opening of the cap insert. Specifically, the heating element is exposed through the bottom portion of the cap insert. As mentioned above, the cap insert of some embodiments is made of a certain grade of stainless steel. For instance, the cap insert can be made of stainless steel grade 430, which has magnetic properties, and is well known for its formability and resistance to corrosion.

Figure 8:
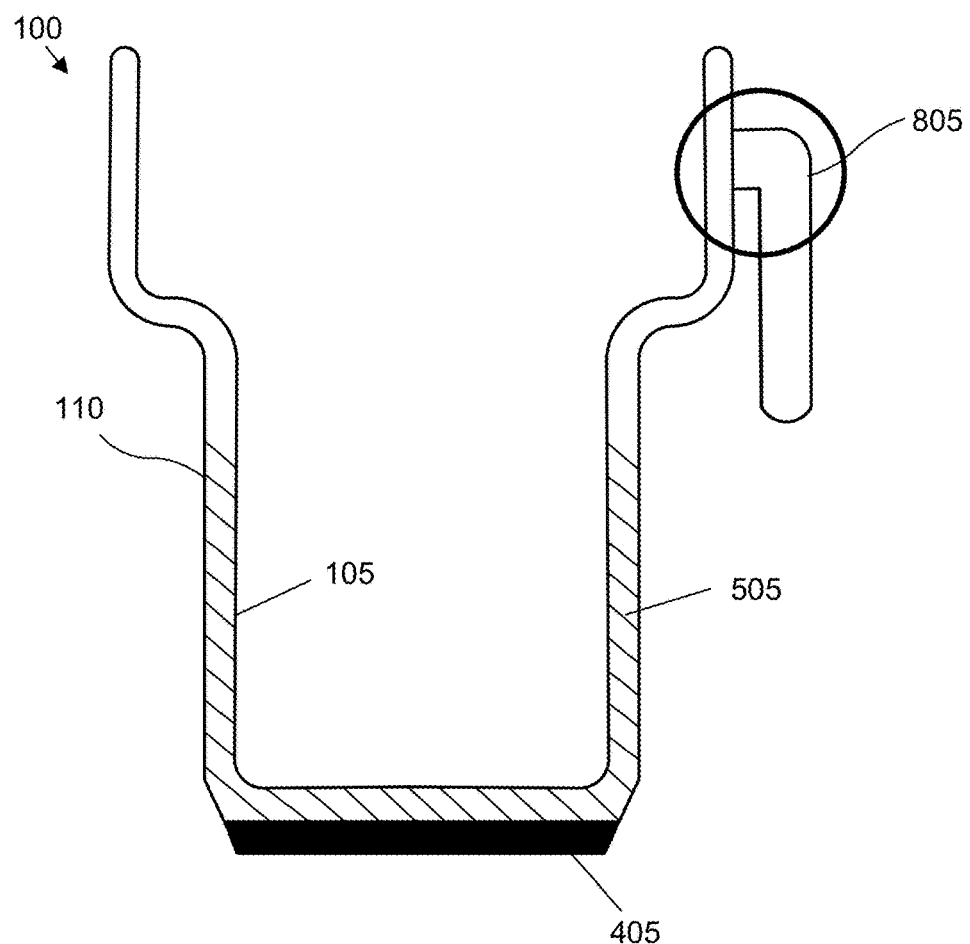
FIG. 8 shows a cross-sectional view of yet another cooking vessel according some embodiments.

FIG. 8 shows a cross-sectional view of yet another cooking vessel according some embodiments. Here, the cooking vessel 100 is a mug (e.g., a coffee mug). In some embodiments, the mug is shaped or formed in such that the mug's lower portion can fit into a cup holder. For instance, the lower portion of the mug 100 has a radius or circumference that is less than the top portion. The top portion of the mug is wider than the lower portion. The smaller radius allows the mug to fit into a cup holder.

As shown in FIG. 8, the mug 100 includes a heating element 405 and a handle. Different embodiments can use one or more different heating elements. As mentioned above, the cooking vessel of some embodiments includes an exothermic plate to convert microwave radiation to thermal energy. In some embodiments, the exothermic plate is composed of a far-infrared emitting heating material. The exothermic plate of some embodiments is composed at least partially of ceramic. An example of a ceramic exothermic plate is called pyrogen. In the example of FIG. 8, the mug 100 has a piece of ferrite rubber 405. The ferrite rubber essentially includes ferrite composites to absorb microwave radiation and generate heat. In some embodiments, the ferrite rubber is attached (e.g., glued) to the bottom outer surface of the mug. A similar ferrite rubber is described above by reference to FIG. 4.

Similar to several of the examples described above, the mug 100 of FIG. 8 includes inner and outer shells 105 and 110. In some embodiments, one or both the shells are made of stainless steel with certain amount of chromium and nickel (e.g., 18/10 respectively). As shown, the inner and outer shells form an inner space that is at least partially filled with a heat-conducting medium. In some embodiments, the heat-conduction medium includes air and/or silicone oil 505. In some embodiments, the inner space is at least partially filled with carbon fiber. In some embodiments, the inner space includes a thermal conductive pad or a thermal conductive gel. In some embodiments, the inner space includes silicone-based material that is mixed with an aluminum oxide compound. In some embodiments, the inner space includes silicone rubber with ferrite particles (e.g., manganese zinc (MnZn) ferrite particles).

In some embodiments, the two shells are welded together. In some embodiments, the two shells are welded together using a set of one or more different welding techniques. The set of welding techniques is used because it completely seals any open space between the top portions of the inner and outer shells (e.g., the top edges of the inner and outer shells), and prevents leakage of the heat conduction medium (e.g., the hot air). In some embodiments, the top ends of the inner shell 105 and the outer shell 110 are welded together by a seamless welding first and then finished by an argon arc welding at the end. This welding structure prevents separation of or explosion at the seam of the inner shell 105 and the outer shell 110. Instead of the seamless welding, a laser welding may be used, in some embodiments.

As shown in FIG. 8, the wall between the inner shell 105 and the outer shell 110 is at least partially filled with silicone oil 505 or carbon fiber. This improves insulation properties of the cooking vessel 100. For instance, once the silicone oil is heated, it can remain heated for an extended period of time (e.g., 2 to 3 hours). To relieve or discharge high pressure generated by the heated heat-conduction medium, the vessel includes an auto pressure relief valve 510. Also, there may be a pocket of air which can expand when heated, and the valve 510 prevents the two shells 105 and 110 from separating in case the heat-conduction medium and/or the pocket of air expands when the vessel is heated.

Figure 9:
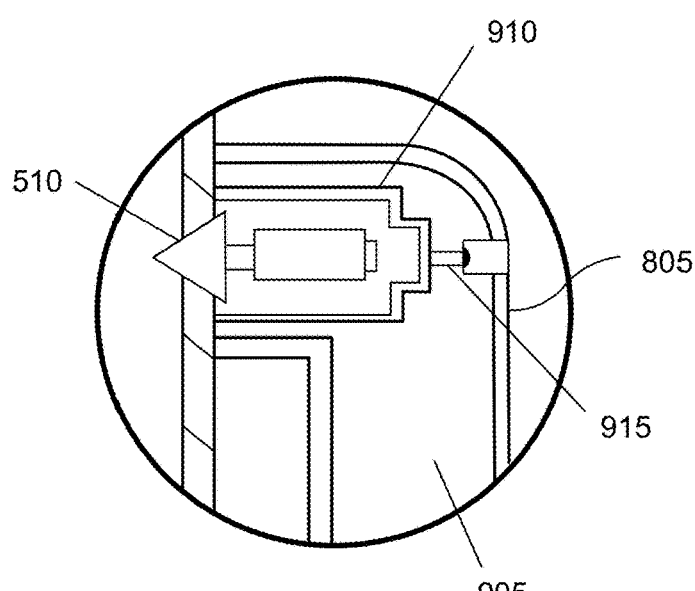
FIG. 9 provides a cross-sectional view of the cooking vessel's handle according to some embodiments.

In some embodiments, the vessel 100 includes a handle 805 that hides the pressure relief valve. FIG. 9 provides a cross-sectional view of the cooking vessel's handle 805 according to some embodiments. In some embodiments, the handle is installed on the external circumference of the container of the mug. In some embodiments, a discharge hole is formed at a proper location on a side of the handle. In some embodiments, the handle is made of silicone-based materials so as to prevent it from overly being heated and slippery. The handle 805 has an inner space 905 or an inner area to house the pressure relief valve. In some embodiments, the handle has discharge hole formed at a proper location (e.g., on the side of the handle). Within the inner space 905, is a bracket 910 or housing that holds the pressure relief valve 510 in place. The bracket 910 is attached to the handle 805 using a screw 915. In some embodiments, the bracket is made of metal (e.g., stainless steel).

Figure 10:
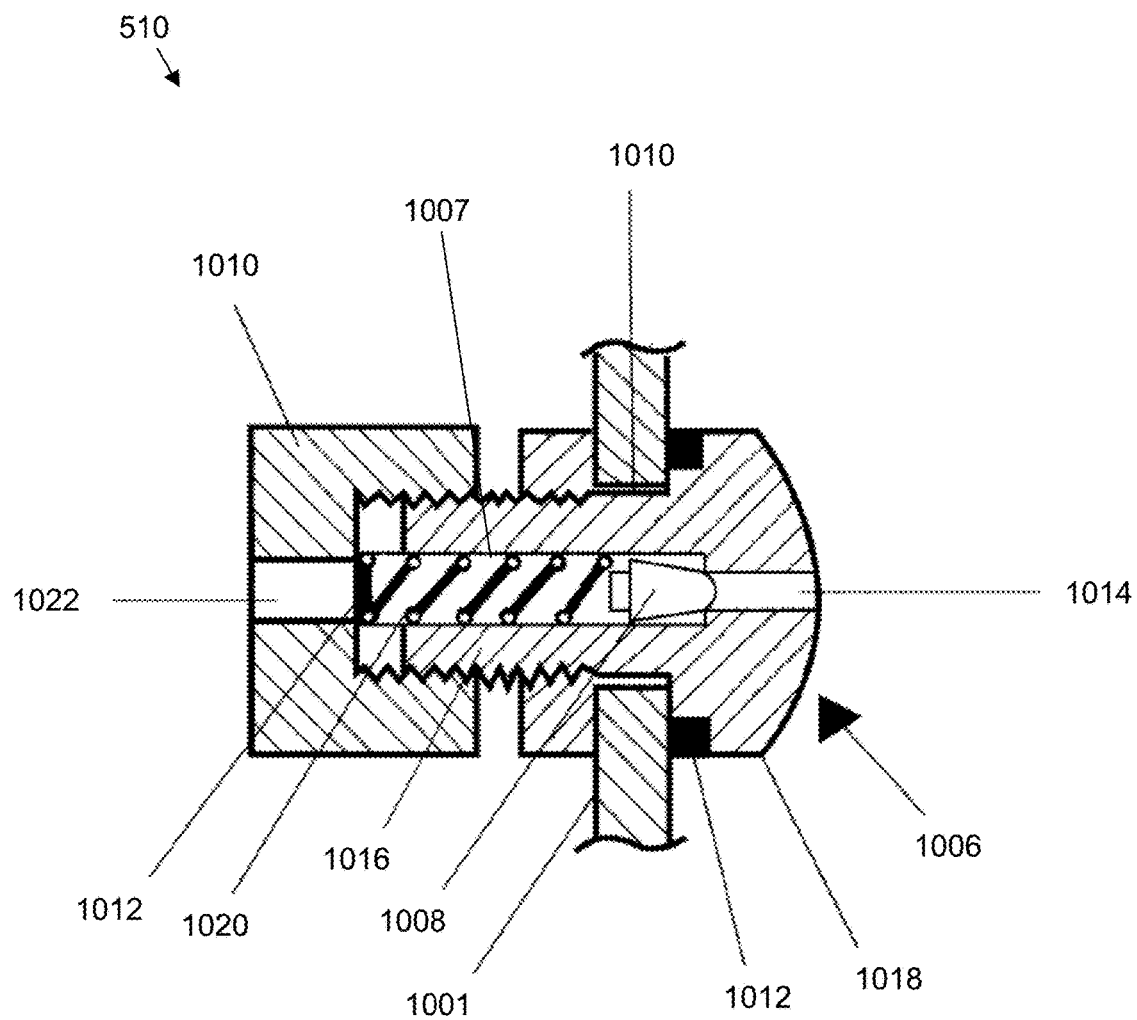
FIG. 10 shows a cross-section view of a pressure release valve of some embodiments.

FIG. 10 shows a cross-section view of a pressure release valve of some embodiments. As shown, the pressure release device 510 is in contact with the vessel 1001 (e.g., the outer shell) through a clamping hole 1010, includes a spring housing 1006. The housing 1006 is affixed to the outer shell of the vessel 1001 The spring housing holds a spring 1020 that contracts with exerted pressure from the inner chamber of the vessel. The pressure release valve also includes a valve head 1008 that seals the inner chamber. The valve head is pushed back in accordance with the tension of the spring 1020 to relieve any pressure built up within the cavity of the vessel. The valve head maybe made of at least partially of silicone rubber, plastic, or metal.

According to some embodiments of the present invention, the spring housing 1006 has a shape of a screw or bolt, which is securely affixed to the outer shell using a fastening nut 1010. The spring housing 1006 defines an opening 1007 with an elongated spring device hole 1012 at one end and a pressure controlling hole 1014 at opposite end, thus sharing the same center axis. On the outer circumference the spring housing 1006 that defines the spring hole 1012, there are threads 1016 for receiving (e.g., screwing on) the fastening nut 1010. The fastening nut has an opening 1022 to discharge excess pressure built-up within the inner chamber between the inner and outer shells.

At the other end of the spring housing 1006, a screw head 1018 is formed to abut against the inner surface of the outer shell. In some embodiments, a washer or packing 1012 may be provided between the screw head 1018 and the outer shell to secure the sealing thereof.

Figure 11:
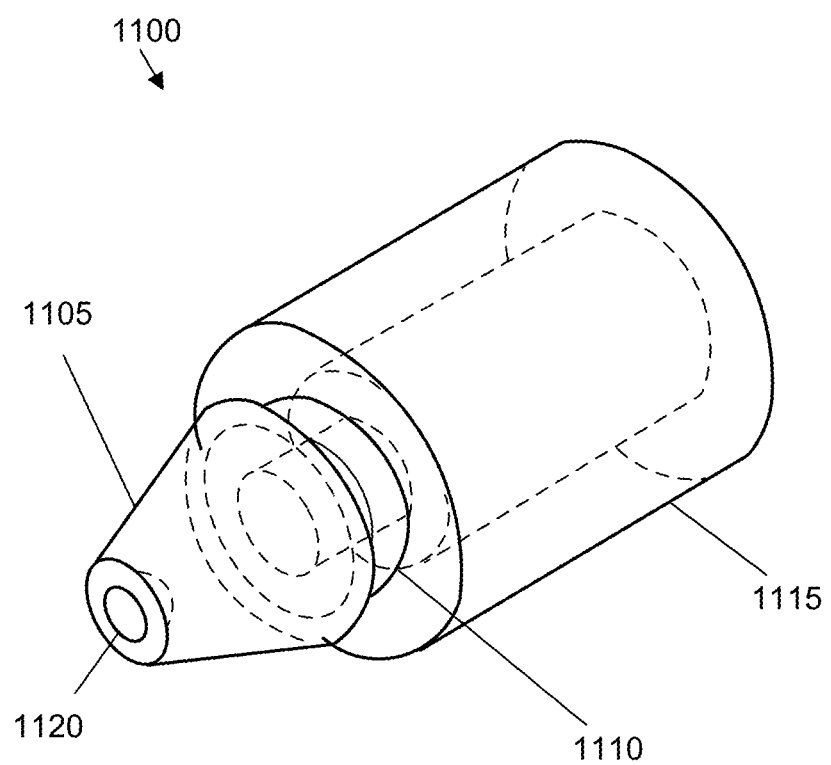
FIG. 11 shows a perspective view of a valve member of a pressure release valve of some embodiments.

Instead of a spring-based valve, the cooking vessel of some embodiments uses a valve made of elastic or compressible material. FIG. 11 shows a pressure control valve 1100 according to some embodiments of the inventions. As shown, the valve 1100, in some embodiments, is made of an elastic or compressible material. The valve 1100 includes a head 1105 having a conical figure so as to open/close an opening formed on the outer shell of the vessel. The valve also includes a support frame 1115 that extends from the head 1105. The shape of the head 1105 may be of a spherical shape and the like. The diameter of the head 1105 is large enough to effectively seal the opening formed on the outer shell of the cooking vessel.

In some embodiments, a recess 1120 is formed on the head 1105 (e.g., on the side nearest to the opening formed on the outer shell) so as to receive a large force (pressure) generated from concentrating the pressure within the inner chamber of the vessel (e.g., on to the smaller square area of the recess instead of the whole side of the head 1105 nearest to the opening).

In some embodiments, the head 1105 extends from a support frame 1115, which has a hollow cylindrical figure, by a neck 1110, which is securely attached or formed next to the head and the support frame. In the example of FIG. 11, the diameter of the neck 1110 is smaller than the diameter of the support frame 1115, thus facilitating the compressibility of the valve 1100. Also, this difference in diameter facilitates further discharge of excess pressure through the support frame 1115 as well. At low temperatures or when there is insufficient pressure (e.g., steam pressure) generated within the inner chamber, the head 1105 effectively seals the opening formed on the outer shell to prevent unnecessary heat loss.

In some embodiments, the valve 1100 is made with silicone rubber because of its elasticity as well as its resistance to high temperature. In some embodiments, a minimum pressure (e.g., between 0.5 and 0.6 Kgf/cm$^2$) is set to cause movement of the head 1105 of the valve 1100 away from the opening formed on the outer shell.

Figure 12:
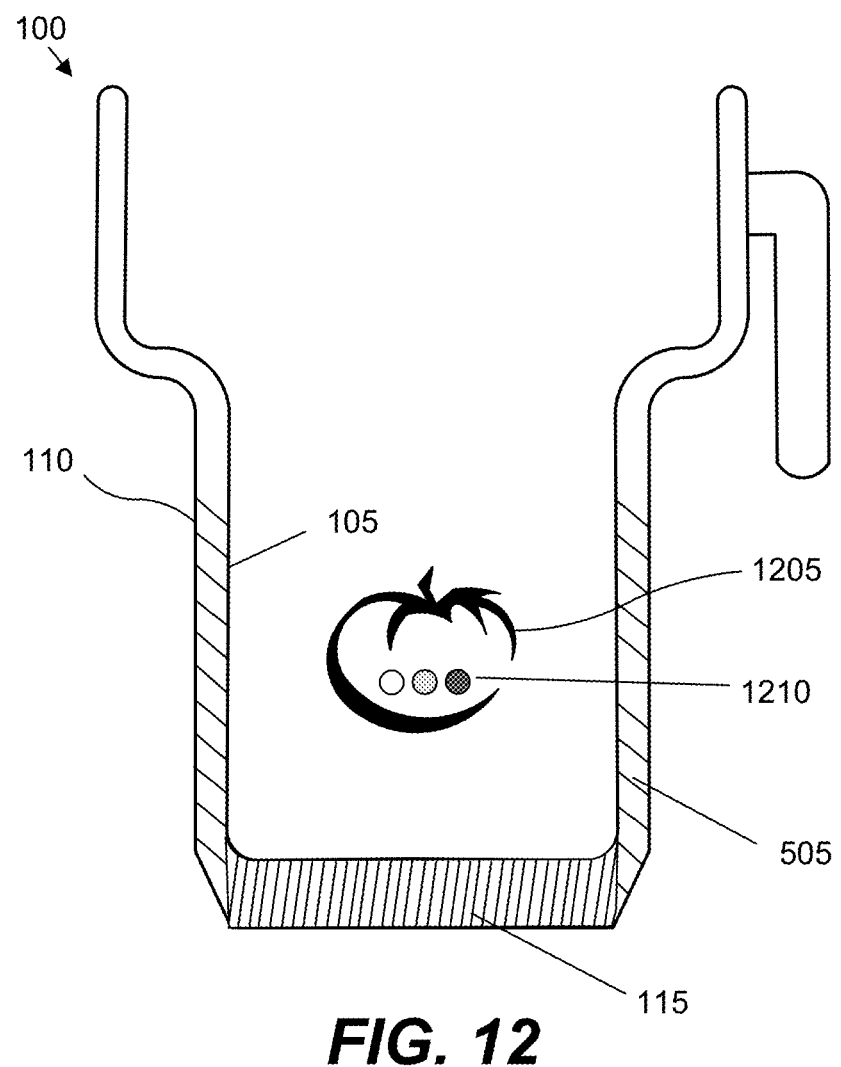
FIG. 12 shows a cross-sectional view of yet another cooking vessel according some embodiments.

FIG. 12 shows a cross-sectional view of yet another cooking vessel 100 according some embodiments. Similar to FIG. 8, the cooking vessel has the shape of a mug. The vessel has inner and outer shells 105 and 110 to form an inner chamber or space. The inner space includes a heat-conducting medium 505. The heat-conduction may be any one or more of the different mediums discussed above, including silicone oil, carbon fiber, ambient air, gel, padding, etc.

Different from FIG. 8, the cooking vessel 105 has a different heating element 115. In this example, the heating element is an exothermic ceramic plate. 115 This plate is placed in between the outer bottom surface of the inner shell 105 and the inner bottom surface of the outer shell 110. To allow microwave absorption, the vessel 100 of some embodiments includes an opening at the bottom of the outer shell. The bottom portions of the inner and outer shells may be welded in some manner such that the heat-conduction medium does not leak through the bottom of the vessel.

FIG. 12 also shows another example of a temperature indicator 1205 according some embodiments of the invention. In this example, at least portion of the outside of the outer shell 110 is coated with thermo-chromic paint or temperature indicator, which can resist high temperature of the cooking vessel 100. The color of the thermo-chromic paint may change as the cooking vessel is heated and its temperature increases.

In some embodiments, the vessel is painted with different colors 1210, such as green, yellow, and red. Each of the different color may change at different temperature. Typically, coffee is usually heated up around 85° C. However, the ideal drinkable temperature is around 50° to 55 C. In some embodiments, the thermo-chromic painted marking on the vessel provides a visual indication relating to these different temperature levels. As an example, the thermo-chromic marking may include a first spot that changes color when the temperature reaches around 40° C., a second spot that changes color when the temperature reaches around 60° C., and a third spot that changes color when the temperature reaches around 85° C. However, some embodiments can have different spots that change at different temperature levels.

Thus, the different colors of the thermo-chromic temperature indicator provide a more exact indication of the temperature of the contents of the cooking vessel than the one described above by reference to FIG. 1. Different embodiments provide different visual indicator(s). For instance, some embodiments provide a lid with a temperature indicator (e.g., temperature gauge). An example of such a visual indicator will be described below by reference to FIG. 20.

The cooking vessel of some embodiments is a multi-purpose vessel that can heat its contents with different appliances and not just the microwave oven. In some embodiments, the multi-purpose vessel can also heat its contents on a gas stove, an electric stove, or an induction cooker. That is, the microwaveable vessel of some embodiments is suitable for heating by microwave oven, stovetop, and induction cooking.

Figure 13:
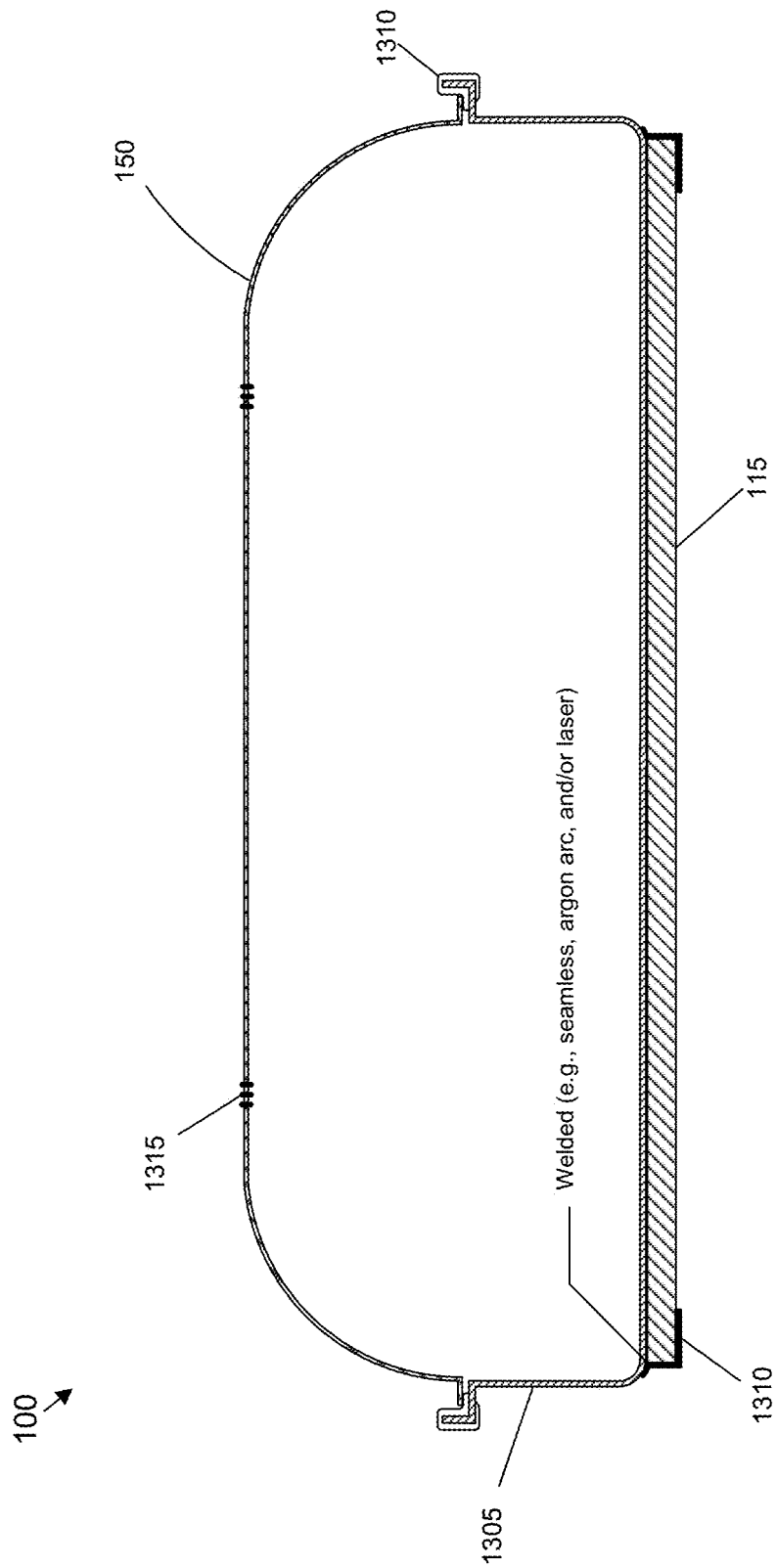
FIG. 13 provides an illustrative example of a multi-purpose cookware according to some embodiments.

FIG. 13 provides an illustrative example of a multi-purpose cookware 100 according to some embodiments. As shown, the multi-purpose includes a body 1305 and a cover or lid 150. In some embodiments, the body is made of certain type of metal. In some embodiments, the metal is stainless steel. In some embodiments, the stainless steel is food grade stainless steel (e.g., 304). The stainless steel may have different amounts of chromium and nickels in different embodiments.

As shown in FIG. 13, the body 1305 is shaped as a receptacle or container to hold food items. Different embodiments use different shapes for the body. In the illustrated example, the body has an open region having a bottom surface that extends upwardly to terminate at a top edge. In some embodiments, the top edge of the body is shaped or pressed in some manner to form a rim. Inner area of the body may be a coated with copper, silver, and/or some other material to quickly distribute heat.

In some embodiments, the multi-purpose cookware includes a lid. The lid can serve multiple purposes. It can reflect microwave radiation. The lid can trap heat and moisture. The lid may include a set of one or more vent holes 1315 to release moisture (e.g., steam). In some embodiments, the vent holes 1315 can be opened or closed (e.g., manually). The lid can also include a handle (not shown). In some embodiments, the lid or the vessel includes a member (e.g., silicone ring, a packing) to prevent arcing (e.g., sparks from appearing between the edges of the lid and the vessel body). In some embodiment, the lid includes a silicone ring to substantially seal the receptacle and thereby prevent heat dissipation. In the example of FIG. 13, a silicone ring wraps the rim of the body. The lid can be placed on top of the ring above the silicone ring.

In some embodiments, the multi-purpose cookware includes an exothermic plate that is affixed to its outer bottom surface. The exothermic plate coverts microwave radiation to thermal energy. In some embodiments, the exothermic plate is composed of a far-infrared emitting heating material. The exothermic plate of some embodiments is composed at least partially of ceramic. An example of a ceramic exothermic plate is called pyrogen. In some embodiments, the exothermic plate can be heated using a gas, electric stove, or induction cooker. This is because the exothermic plate can withstand up to or in excess of 1500° C. On the other hand, a stovetop only reaches up to around 500° C.

In some embodiments, the exothermic plate is affixed to a plate supporting member, cap, or housing. In the example of FIG. 13, a cap surrounds the heating element 115. In some embodiments, the cap is welded to the body using a set of one or more different welding techniques (e.g., e.g., seamless, argon arc, and/or laser). In some embodiments, the cap is made of metal (e.g., stainless steel) to allow the cookware to be heated on top of an induction cooking plate or stove top (e.g., gas or electric). In some embodiments, the ceramic plate (e.g., with the outer metal steel housing) can reach up to and in excess of 80° C. in less than three minutes in the microwave oven.

In some embodiments, the multi-purpose cookware may be coated with an exothermic enamel glaze or exothermic ceramic glaze. For instance, the outer-surface of the body of the cookware can be at least partially coated with the exothermic enamel glaze. As mentioned above, the exothermic enamel glaze or exothermic ceramic glaze may include manganese-zinc ferrite and ferrosilicon to absorb microwaves and generate heat. In some embodiments, the outer surface of the body is coated by spray coating a mixture of manganese-zinc ferrite and ferrosilicon to improve exothermic conductivity. In some embodiments, the exothermic ceramic glaze is a mixed compound comprising ferrite, silicon (Si), and aluminum (Al).

Figure 14:
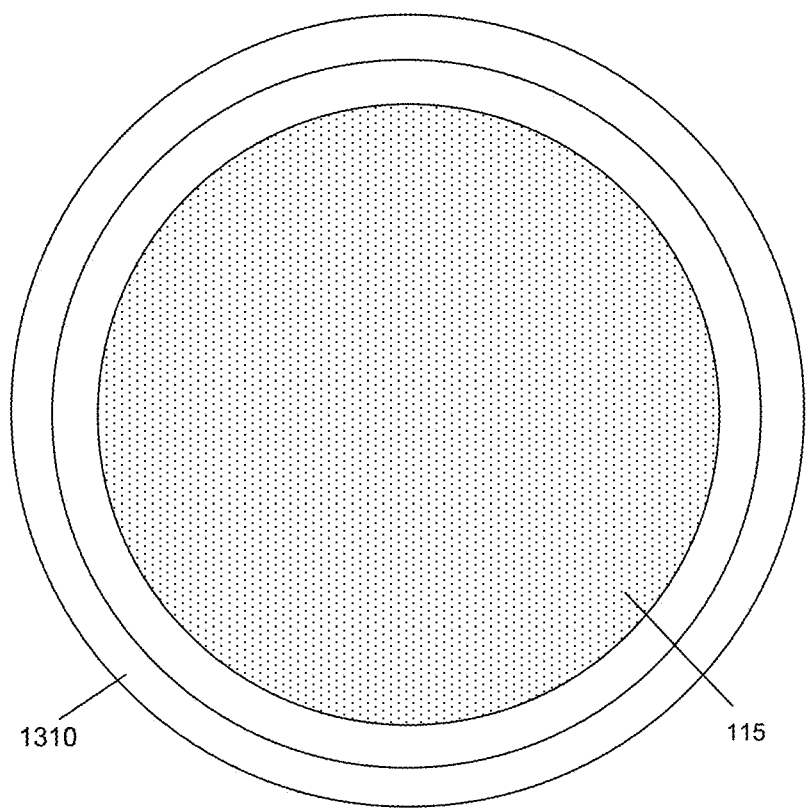
FIG. 14 shows an outer bottom view of the multi-purpose cookware of FIG. 13.

FIG. 14 shows an outer bottom view of the multi-purpose cookware of FIG. 13. Specifically, this figure shows that the metal cap housing 1310 may have the same shape as the exothermic plate 115. The same shape allows the housing to securely house the plate. In the illustrated example, the cap housing and the exothermic plate are round. The housing cap 1310 also has an opening that exposes the exothermic plate 115 (e.g., to microwave radiation, fire, heated surface, etc.). In some embodiments, the cap housing or insert is made of metal that contains magnetic properties (i.e., ferromagnetic metal) such as stainless steel. Using ferromagnetic metal is important here because it allow the cookware to heat food items on an induction cooker. The metal can also absorb heat emanating from a gas stove or an electric stove. In some embodiments, the cap housing or insert is made of a certain grade of stainless steel. For instance, the cap housing can be made of stainless steel grade 430, which has magnetic properties, and is well known for its formability and resistance to corrosion.

Figure 15:
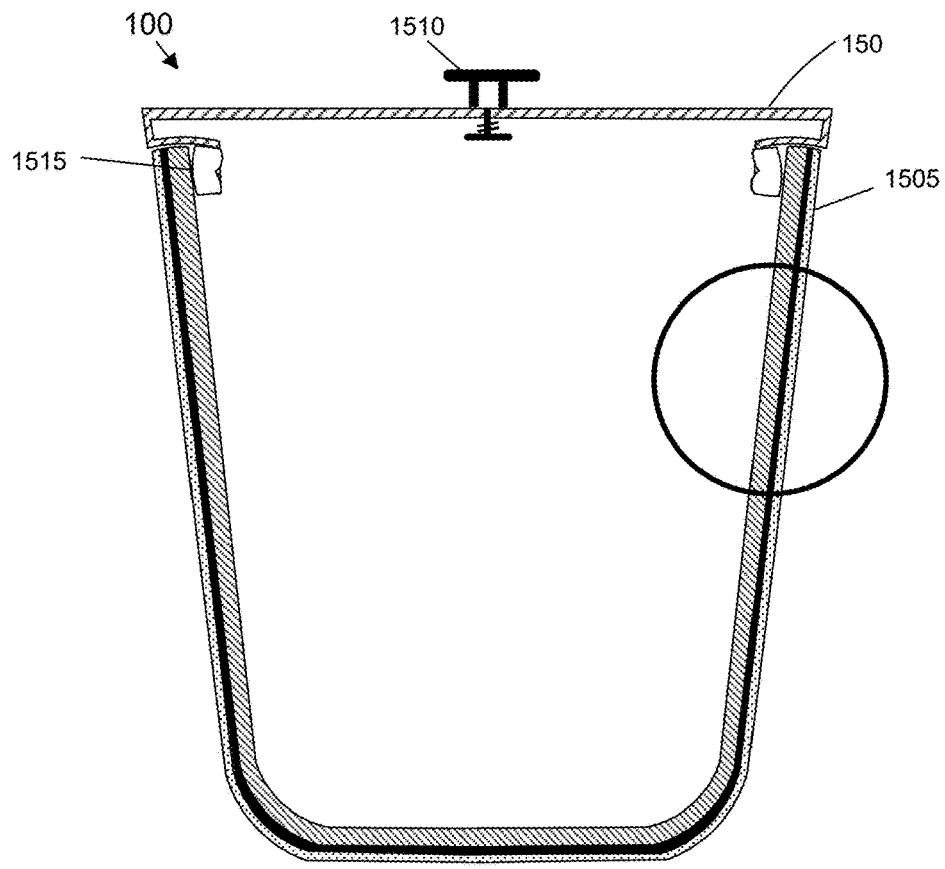
FIG. 15 shows another example of a microwaveable vessel according to some embodiments.

FIG. 15 shows another example of a microwaveable vessel 100 according to some embodiments. This figure will be described by reference to FIG. 16, which shows a more detailed view of the different layers of the body of the microwaveable vessel. FIG. 15 shows a single shell version of a microwaveable vessel.

As shown in FIG. 15, in some embodiments, the vessel includes a body 1505 adapted to hold food or drinks. The body has a bottom side with a set of one or more walls that extend upwardly from the bottom side to form a receptacle or container. In some embodiments, the body is made of certain type of metal. In some embodiments, the metal is stainless steel. In some embodiments, the stainless steel is food grade stainless steel (e.g., 304). The stainless steel may have different amounts of chromium and nickels in different embodiments. In some embodiments, the outer surface area of the body is (e.g., completely) coated with a layer of heat-generating glaze. The inner surface area of the body may also be coated with silver, copper, or some other material.

Figure 16:
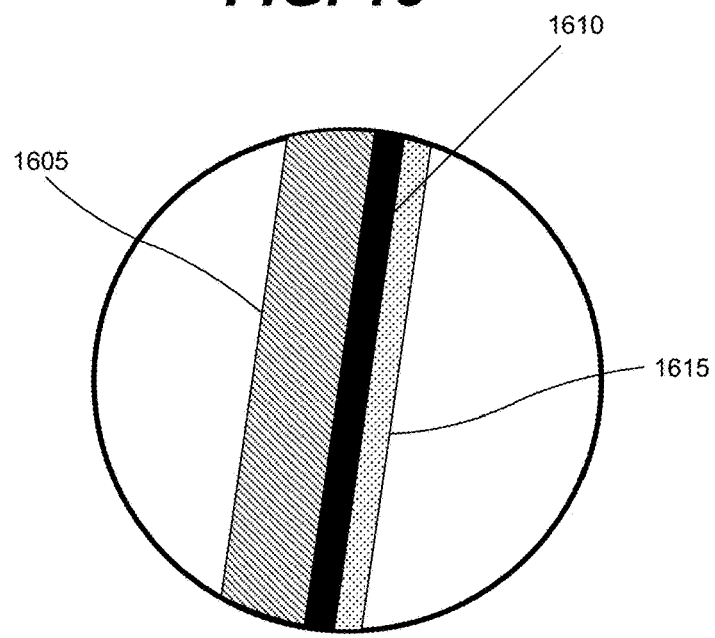
FIG. 16 illustrates a more detailed view of the different layers of the body of the microwaveable vessel of FIG. 15.

As shown in FIG. 16, the body is coated with a heat-generating glaze 1610. Specially, the outer surface of the metal body 1605 is covered with the heat-generating glaze 1610. A heat resistant outer layer 1615 covers the heat-generating layer 1610. The heat-generating glaze 1610 of some embodiments absorbs electromagnetic waves from the microwave oven's magnetron and converts them into thermal energy through oscillation. The thermal energy is then transferred to the metallic body, which causes the contents of the vessel to be evenly heated from all sides of the vessel, including its side wall(s) and the bottom side. In some embodiments, the heat-generating glaze is an exothermic enamel glaze or exothermic ceramic glaze that has manganese-zinc ferrite and ferrosilicon. In some embodiments, the exothermic ceramic glaze is a mixed metal alloy powder compound comprising ferrite, silicon (Si), and aluminum (Al). In some embodiments, the glaze is coated on at least a portion of the outer surface vessel and dried. In order to produce the outer enamel, the dried glaze may be subject to a glassification process.

The heat-resistant outer layer covers the heat-generation layer. In some embodiments, the heat-resistant outer layer serves multiple purposes. The heat-resistant outer layer may insulate the vessel by trapping heat. The heat-resistant outer layer may make the vessel safe to touch when heated. Different embodiments use different materials for the heat-resistant outer layer. In some embodiments, the heat-resistance outer layer has heat resistance up to and excess of 260°

C. In some embodiments, the heat-resistant layer is composed of polystyrene such as syndiotactic polystyrene (SPS). In some embodiments, the heat-resistant layer is composed of a polymer such as polyphenylene sulfide (PPS). To enhance the exothermic properties of the vessel, the PPS of some embodiments includes exothermic particles.

Referring to FIG. 15, the microwaveable vessel of some embodiments includes a lid 150 or cover. In some embodiments, the lid or the vessel (upper portion of the vessel) is surrounded by a silicone member 1515 (e.g., silicone ring, a packing) to prevent arcing (e.g., sparks from appearing between the edge(s) of the lid and the vessel body). When the lid is placed on the vessel, the silicone member may be sit on the top edge(s) of the vessel to form a rim. The rim prevents sparks being formed between the top edge(s) of the vessel and the lower portion of the lid that sits on the edge(s). As an example, the silicone ring may also be formed in some manner such that the edge of the lid is shielded from the edge of the body in order to prevent arcing.

In some embodiment, the silicone member substantially seals the receptacle to prevent heat dissipation. In the example of FIG. 15, the member 1515 surrounds the portion of the lid (e.g., the projecting edge) that is inserted into the body 1505.

In some embodiments, the lid includes a handle. The handle can be used to place the lid on top the body or remove it from the body. FIG. 17 provides a cross sectional view of a lid handle 1510 according to some embodiments of the invention. The handle includes a top handle portion 1705, and a body or bottom portion 1725. In some embodiments, the body 1725 is screwed onto the outer surface of the lid with a screw 1720 through a hole on the lid. The handle 1510 may also include one or more support members 1715 to prevent the handle from rotating on or disengaging from the lid. In some embodiments, the lid includes a whistling component or member 1710 that whistles when the vessel exerts vapor. In the example of whistling member 1710 is a part that is housed in the body of handle. The whistling member may be made of metal (e.g., stainless steel) or some other material (e.g., plastic).

FIG. 18 shows a bottom view of the handle 1510 according to some embodiments. This figure shows that that the handle of some embodiments is attached to the lid with a screw 1720. The handle can also include one or more support members 1715 to keep the handle in place (e.g., in a particular position so that the handle remains in place and is not rotated).

In some embodiments, the lid includes a pressure release switch. FIG. 19 shows a lid handle 1510 with such a pressure release switch 1910. The switch 1910 sits on top of the body 1725 of the handle. In some embodiments, the switch has a round shape so that it can be rotated or switched to different positions (e.g., on or off). The switch is inserted into a hole formed on the bottom portion 1725 of the handle. On the side of the bottom portion of the handle is a hole 1905 or an exhaust port. When the switch is in the open position, the hole allows vapor (i.e., steam) to exit the vessel.

As shown, the switch can be rotated in one direction to release steam or heated vapor through one or more holes of the lid. The switch can also be rotated in the opposite direction to substantially seal the microwaveable vessel. The vapor, however, may still leave the vessel through the hole formed on the whistling member 1710.

Figure 20:
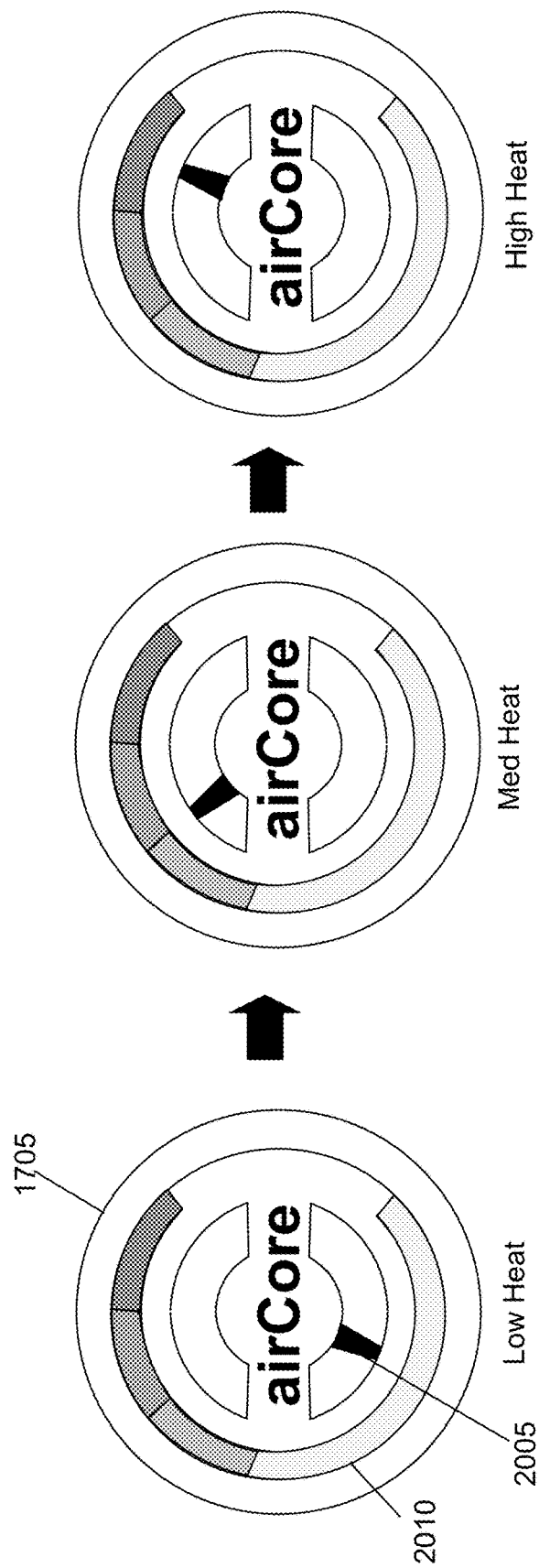
FIG. 20 shows the top view of the lid handle according to some embodiments.

FIG. 20 shows the top view of the lid handle according to some embodiments. As shown, the lid handle of some embodiment includes a temperature gauge 2010 (e.g., on the top portion 1705 of the handle). The gauge 2010 of some embodiments includes a knob 2005 that rotates with the change in temperature within the vessel. In some embodiments, the gauge is marked in some manner to provide a visual indication of the temperature within the vessel. In the example of FIG. 20, the knob rotates to different colors as the temperature changes. For instance, the gauge 2010 may provide different colors to represent low heat, medium heat, high heat, etc. Instead of or in conduction with color indicators, the gauge 2010 might provide textual and/or numerical indicators.

Figure 21:
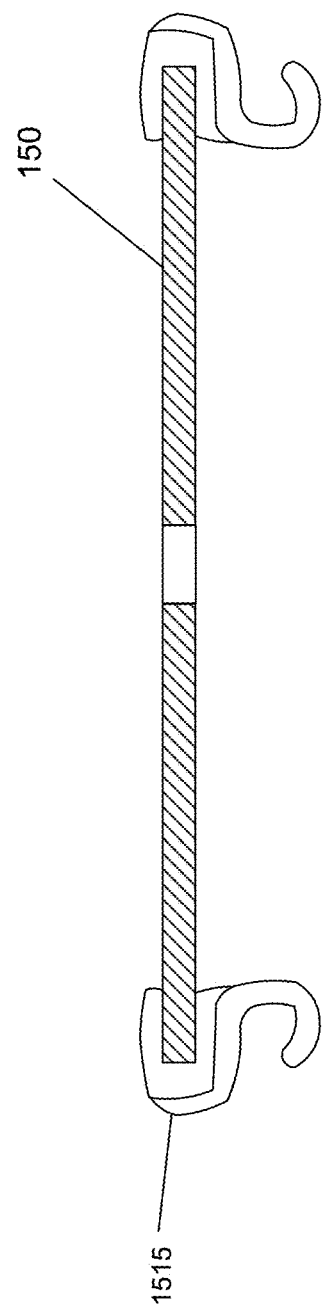
FIG. 21 shows a cross sectional view of a lid with a silicone member according to some embodiments.

FIG. 21 shows a cross sectional view of the lid 150 and the silicone member 1515 according to some embodiments. The silicone member of some embodiments is a silicone ring. The silicone ring may be formed in some manner such that the edge of the lid is shielded from the edge of the body in order to prevent arcing. As shown, the outer edge of the lid 150 is completed surrounded by a silicone ring 1515. The silicone ring 1515 may have a bottom portion or ring that is inserted into the body of the microwaveable vessel. In some embodiments, the silicone member is securely affixed to the lid in some manner (e.g., glued or screwed onto the lid). In some embodiments, when the microwaveable vessel is heated, the silicone ring expands due to pressure within vessel and seals it. The vapor then leaves the vessel through one or more of the openings on the lid (e.g., through the whistling member, the exhaust port).

Figure 22:
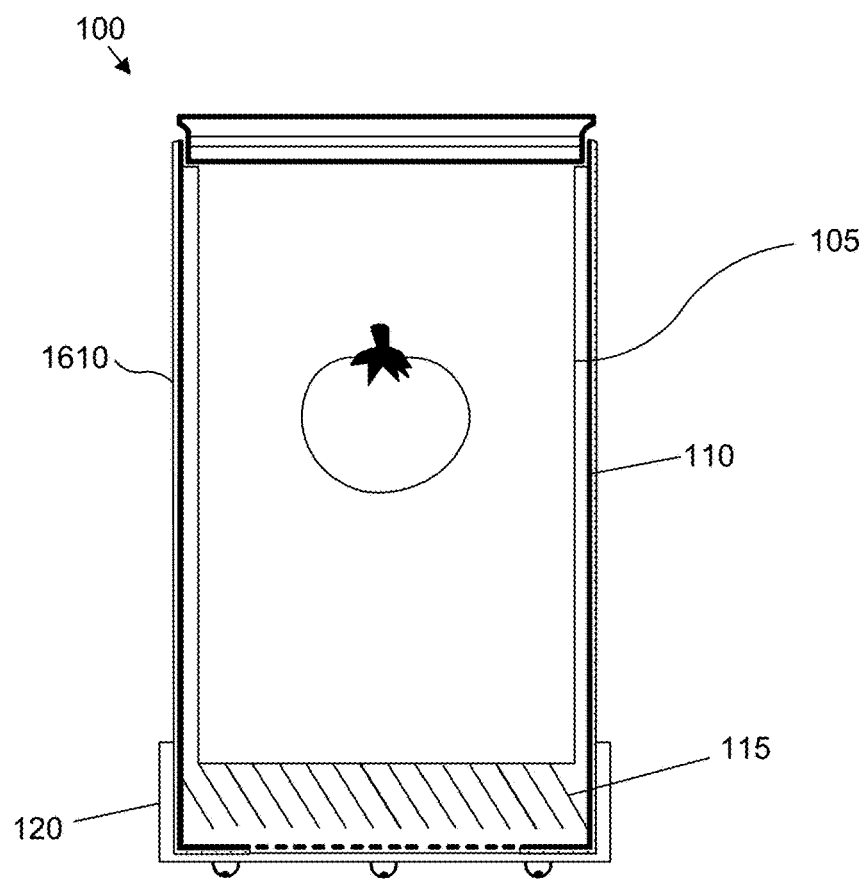
FIG. 22 shows an example of a microwaveable vessel according to some embodiments of the invention.
Figure 23:
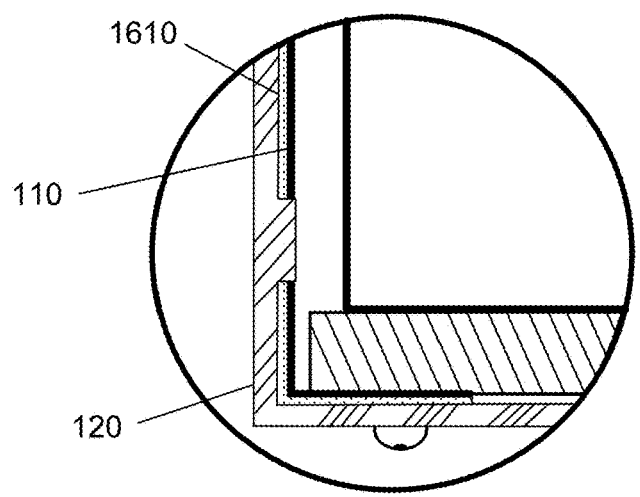
FIG. 23 shows a cross-sectional view of the vessel of FIG. 22.

Different embodiments can include different combination of elements. Several additional examples will now be described by reference to FIGS. 22-30. FIG. 21 shows an example of a microwaveable vessel 100 according to some embodiments of the invention. FIG. 23 shows a cross-sectional view of the vessel 100 of FIG. 22. These two figures are similar to FIGS. 1 and 2. They show a multi-layered vessel. However, the outer shell 110 of the vessel 100 is coated with an exothermic enamel glaze 1610. In particular, the outer surface of the outer shell 110 is at least partially coated with the exothermic glaze. The inner shell (e.g., the outer surface of the inner shell) is not coated because microwaves cannot pass through the metallic outer shell. Also, FIG. 23 shows that heating element 115 is not supported by (e.g., sits on) any supporting members (e.g., formed on the bottom of the outer shell). Instead, the heating element sits on a flat surface (e.g., of the bottom portion of the outer shell). In some embodiments, the heating element is placed or inserted between the inner and outer shells 105 and 110 such that it is in contact with the inner-bottom surface of the outer shell and the outer-bottom surface of the inner shell. These figures also show that a heat-resistant member 120 (e.g., heat-resistant silicone) covers at least a portion of (e.g., bottom portion) of the outer surface of the outer shell that is coated with the exothermic enamel glaze.

Figure 24:
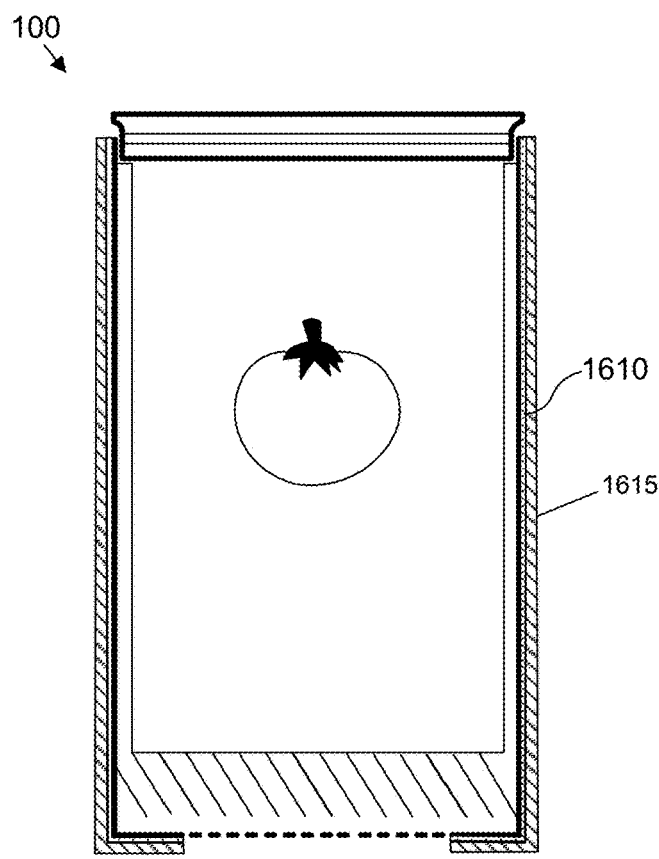
FIG. 24 shows another example of a microwaveable vessel according to some embodiments of the invention.
Figure 25:
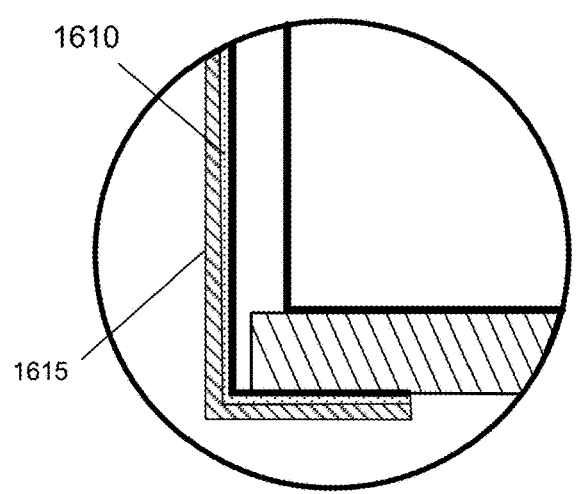
FIG. 25 shows a cross-sectional view of the vessel of FIG. 24.

FIG. 24 shows another example of a microwaveable vessel 100 according to some embodiments of the invention. FIG. 25 shows a cross-sectional view of the vessel 100 of FIG. 24. These two figures are also similar to FIGS. 1 and 2. However, the heat resistant member 120 (e.g., the heat-resistant silicone) has been replaced with the heat-resistant outer layer 1615 described above by reference to FIGS. 15 and 16. As mentioned above, the heat-resistant layer of some embodiments is composed of polystyrene such as syndiotactic polystyrene (SPS). Alternatively, the heat-resistant layer of some embodiments is composed of a polymer such polyphenylene sulfide (PPS). The PPS may be mixed with exothermic particles, in some embodiments.

Figure 26:
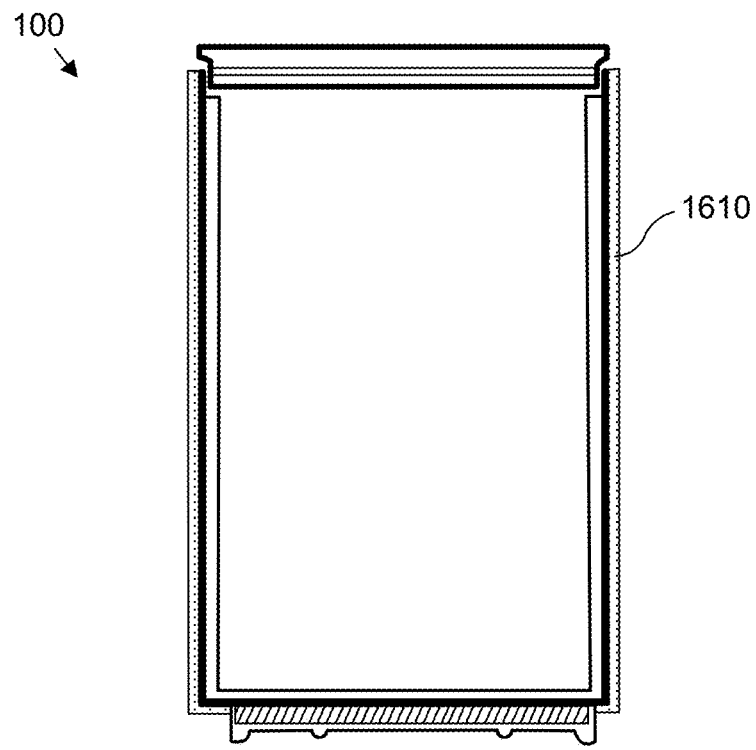
FIG. 26 shows yet another example of a microwaveable vessel according to some embodiments of the invention.
Figure 27:
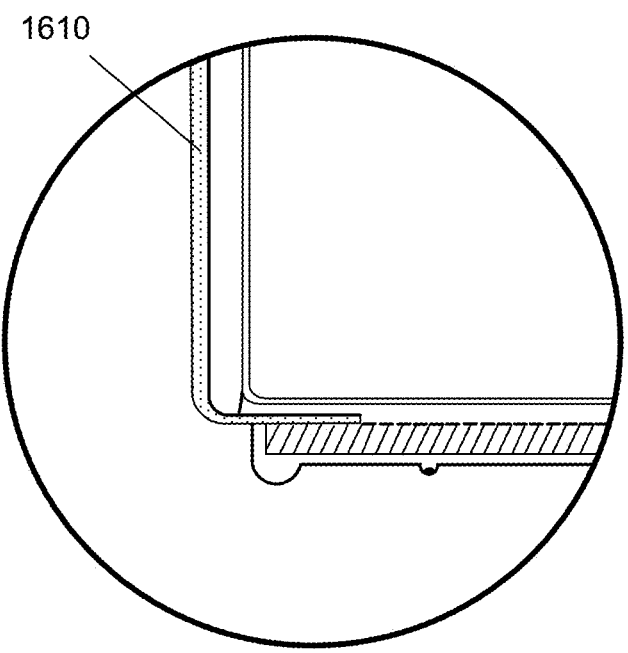
FIG. 27 shows a cross-sectional view of the vessel of FIG. 26.

FIG. 26 shows yet another example of a microwaveable vessel 100 according to some embodiments of the invention. FIG. 27 shows a cross-sectional view of the vessel 100 of FIG. 26. Unlike the previous two examples, these two figures are similar to FIGS. 3 and 4. However, these two figures show that the outer surface of the outer shell is at least partially coated with an exothermic glaze. The exothermic glaze can also be used to coat the vessels of FIGS. 5, 8, 12, and 13.

Figure 28:
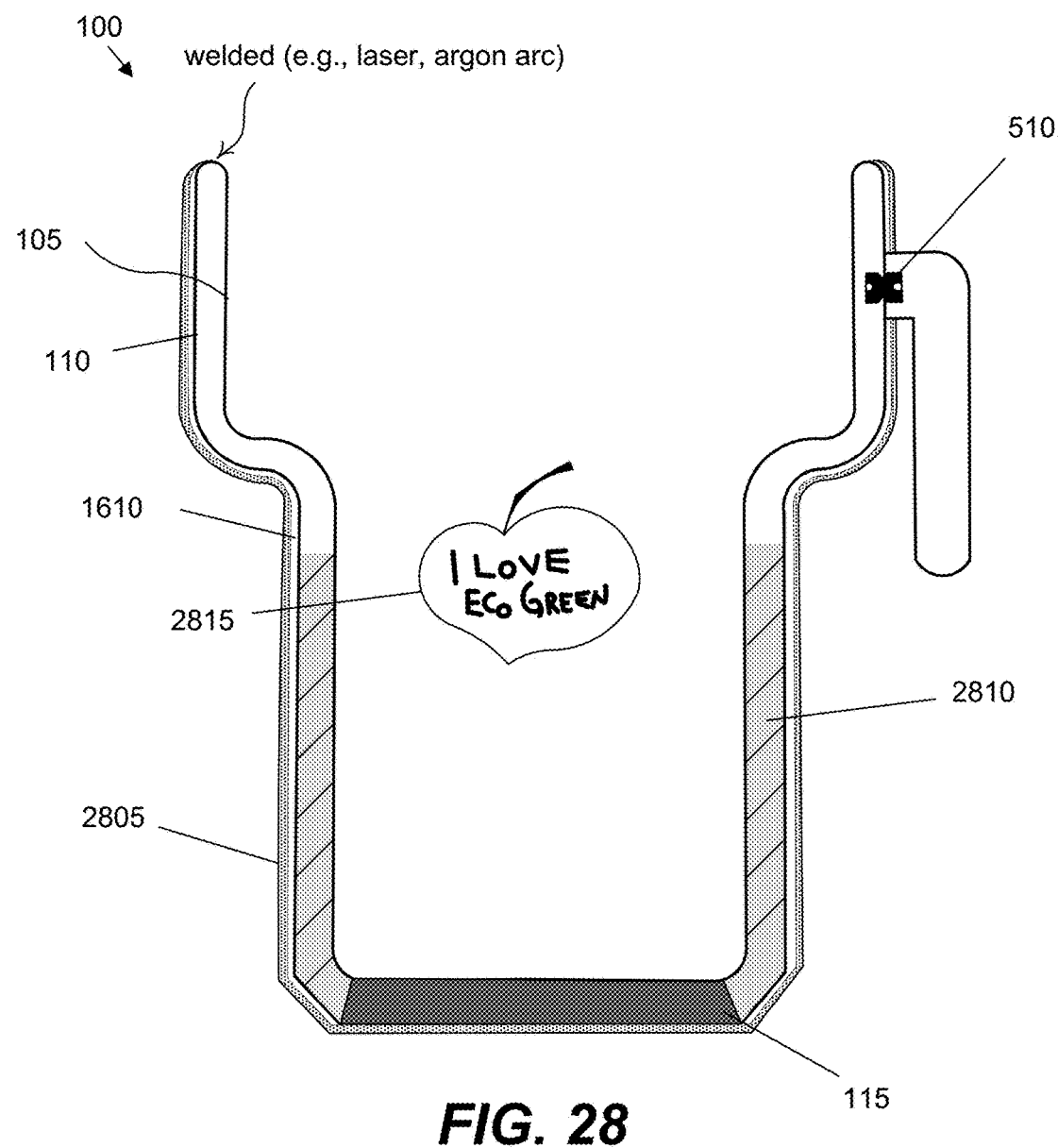
FIG. 28 shows another example of a microwaveable vessel according to some embodiments of the invention.

FIG. 28 shows another example of a microwaveable vessel 100 according to some embodiments of the invention. As shown, the vessel 100 is shaped as a container, and has inner and outer shells 105 and 110 that are joined to form a cavity between the inner and outer shells. In some embodiments, the top edges of the two shells are joined together at the seam via a set of one or more different welding techniques (e.g. laser, argon arc). An exothermic plate 115 is disposed between the inner and outer shells. Here, the exothermic plate is exposed along the bottom side of the outer shell to absorb microwaves and convert the microwaves to thermal energy.

The cavity or the chamber between the inner and outer shells is filled at least partially with a heat retention medium (e.g., a thermal conductive material) to absorb and retain the heat for a period of time. In some embodiments, at least a portion of the outer surface of the outer shell is covered with a thermal insulator 2805 to insulate the vessel when heated.

Different embodiments use different thermal conductive material as the heat retention medium. In some embodiments, the heat retention medium includes ambient air and/or silicone oil. Alternatively, the heat retention medium can be a thermal conductive pad or a thermal conductive gel. To withstand high temperature, the pad or gel may be silicone based, in some embodiments. In some embodiments, the heat retention medium includes silicone-based material that is mixed with an aluminum oxide compound. The aluminum oxide compound assists in absorbing and distributing the heat generated by the exothermic plate 115. In some embodiments, the heat retention medium includes silicone rubber having ferrite particles. The ferrite particles in the rubber can also absorb the electromagnetic waves (e.g., that pass through exothermic plate) to generate thermal energy.

As mentioned above, at least a portion of the outer surface of the outer shell is covered by a thermal insulator 2805 to insulate the vessel when heated. In some embodiments, the thermal insulator 2805 includes a syndiotactic polystyrene (SPS) compound. The thermal insulation layer may be formed using a polyphenylene sulfide (PPS) compound. The PPS compound may be mixed with exothermic particles or powder, such as carbon. The carbon content of the exothermic PPS facilitates in absorbing electromagnetic waves to generate heat.

As shown in FIG. 28, at least a portion of the outer surface of the outer shell is further covered by an exothermic enamel glaze or exothermic ceramic glaze 1610. In some embodiments, the glaze is coated on at least a portion of the outer surface of the outer shell and dried. In order to produce the outer enamel, the dried glaze may be subject to a glassification process.

In some embodiments, at least a portion of the outer surface of the outer shell is covered with a thermochromic paint 2815 that changes to one or more different colors when the container is heated and returns to its previous color(s) when the container is cooled. The vessel also includes a pressure release value 510 to release any excess pressure built up between the inner and outer shells when the container is heated. Examples of such a valve are described above by reference to FIGS. 10 and 11.

Although not shown, the microwaveable vessel may include a metallic lid to reflect the microwaves. The lid prevents the contents of the vessel from being bombarded with the microwaves, which can cause the contents to dry up. The microwaveable vessel may also include an elastic member (e.g., silicon ring, packing) between the metallic lid and the container to prevent arcing between edges of the metallic lid and the container. An example of such an elastic member is described above by reference to FIGS. 15 and 21. In the example of FIG. 28, the microwaveable vessel is shaped like a mug. However, the vessel can be shaped differently. For instance, vessel can be shaped as a pot, a pan, a bake ware, etc.

Figure 29:
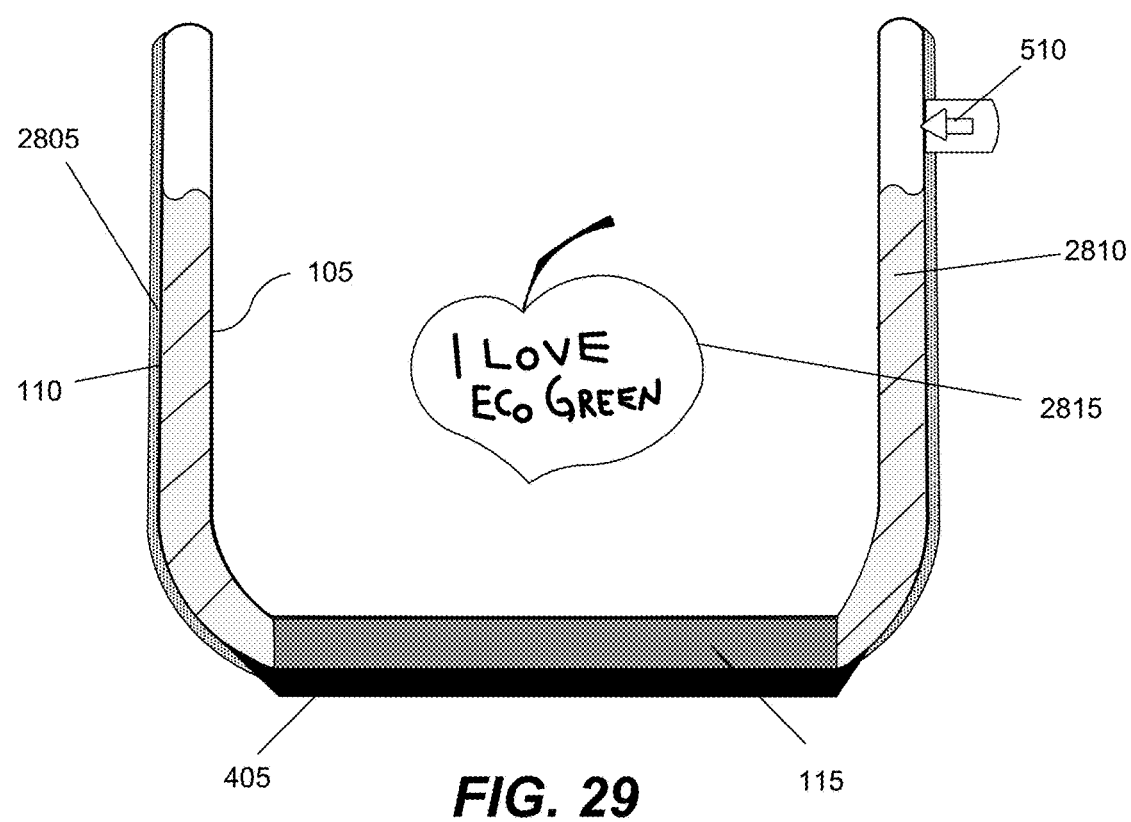
FIG. 29 shows another example of a microwaveable vessel according to some embodiments of the invention.

FIG. 29 shows another example of a microwaveable vessel 100 according to some embodiments of the invention. The vessel is similar to the one shown in the previous figure. The vessel includes the inner shell 105, the outer shell 110, the heat-retention medium 2810, the exothermic plate 115, the thermochromic paint 2815, the pressure release valve 510, and the thermal insulation layer 2805. However, this version of the vessel does not include the exothermic glaze. Rather, the vessel includes a piece of ferrite rubber 405 that is attached to the outer bottom surface and covers the exothermic plate. Further, instead of a mug, the vessel is shaped like a pot.

Figure 30:
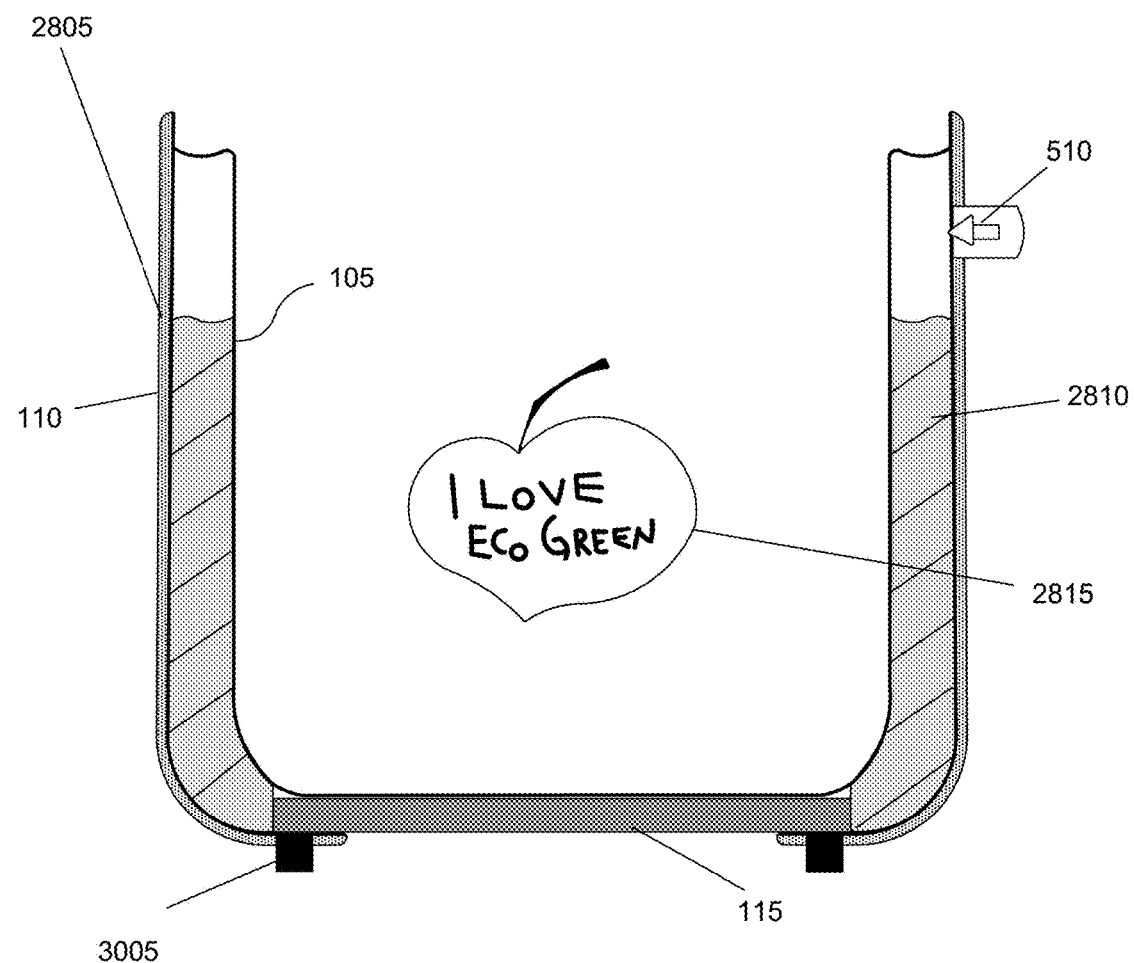
FIG. 30 shows another example of a microwaveable vessel according to some embodiments of the invention.

FIG. 30 shows another example of a microwaveable vessel 100 according to some embodiments of the invention. The vessel is similar to the one shown in the previous two figures. The vessel includes the inner shell 105, the outer shell 110, the heat-retention medium 2810, the exothermic plate 115, the thermochromic paint 2815, the pressure release valve 510, and the thermal insulation layer 2805. However, this version of the vessel is footed with a set of bottom support members 3005. Also, the rim around the vessel where the lid is supposed to sit is curved. When the lid is placed on the vessel, the curved rim allows moisture that is evaporating from the vessel to collect in the curved area to create a moisture seal.

Figure 31:
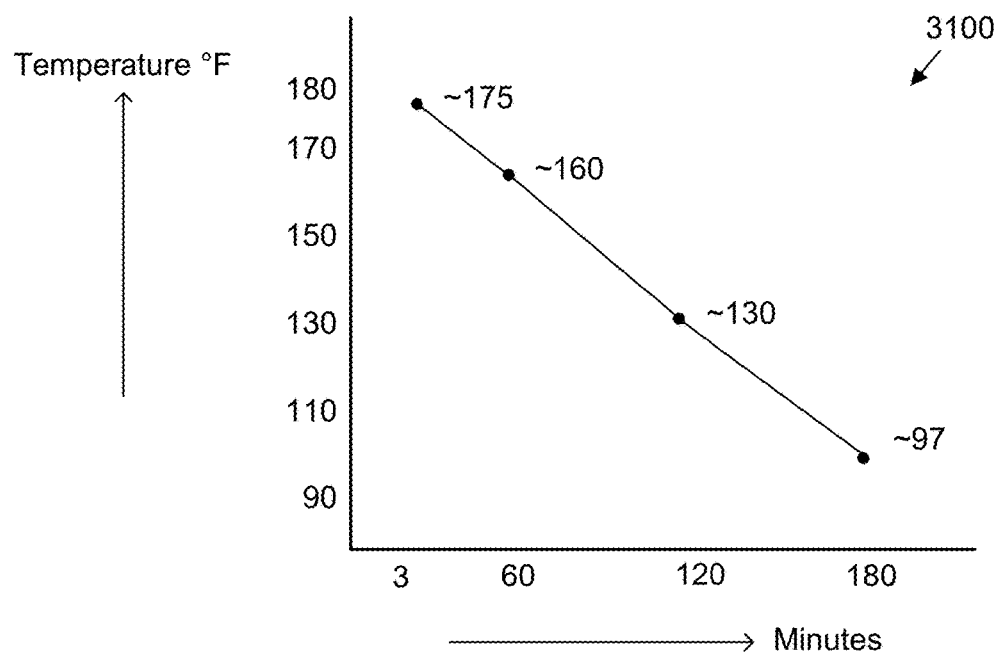
FIG. 31 shows a graph with the results of a thermal conductivity test performed on the microwaveable vessel of FIG. 30.

As mentioned above, once heated, the microwaveable vessel of some embodiments can remain heated for an extended period of time. FIG. 31 shows a graph 3100 with the results of a thermal conductivity test performed on the microwaveable vessel of FIG. 30. The graph 3100 has a y-axis that represents temperature and an x-axis that represents time. The points on the graph represent the temperature of the contents (i.e., water) in the container at different period of time, starting from the three-minute mark. The three-minute mark represents the duration of time that the vessel was placed in a microwave oven and exposed to the microwaves.

As shown by the graph 3100 in FIG. 31, at the three minute mark, the temperature of the contents of the vessel is around 175° Fahrenheit (F). The temperature then slowly decreases to around 160° F. at the 60 minute mark. Again, the temperature slowly decreases to about 130° F. at the 120 minute mark. Then finally, the graph shows that the contents of the vessel is about 97° F. at the 180 minutes mark.

Figure 32:
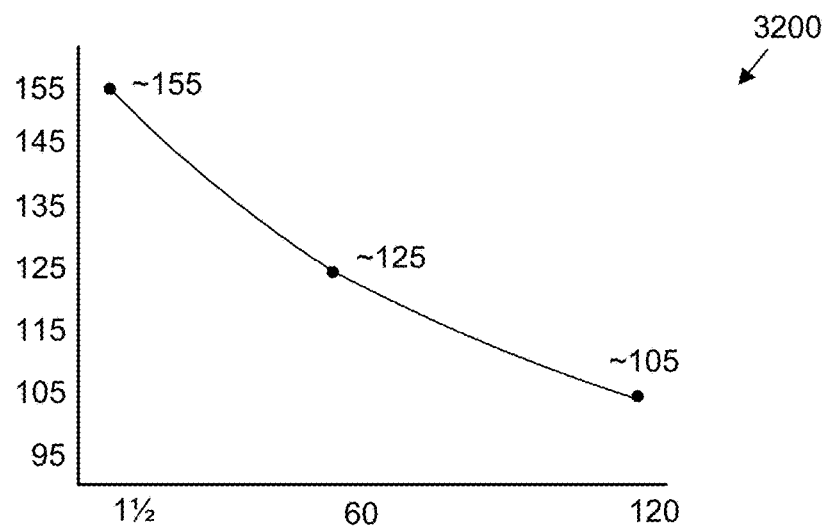
FIG. 32 shows another graph with the results of a thermal conductivity test performed on the microwaveable vessel of FIG. 30.

FIG. 32 shows another graph 3200 with the results of a thermal conductivity test performed on the microwaveable vessel of FIG. 30. Different from the previous figure, the graph shows a 1½ minutes thermal conductive test. As shown at the 1½ minute mark, the temperature of the content of the vessel is about 155° F. Thereafter, the temperature slowly decreases to about 125° at the 60 minute mark. Then, the graph 3200 shows that the temperature slowly drops to about 105° F. at the 120 minute mark.

While the invention has been described with reference to numerous specific details, it is to be understood that the invention can be embodied in other specific forms without departing from the spirit of the invention. For instance, any one of the vessels described above without the coat of exothermic enamel glaze can be coated with that glaze. Thus, one of ordinary skill in the art would understand that the invention is not to be limited by the foregoing illustrative details, but rather is to be defined by the appended claims.

What is claimed is:

1. A double-layered microwaveable vessel comprising:
a container having inner and outer shells that are joined to form a cavity between the inner and outer shells;
an exothermic plate disposed between the inner and outer shells, and exposed along the bottom side of the outer shell to absorb microwaves and convert the microwaves to heat;
a heat retention medium in the cavity between the inner and outer shells to absorb and retain heat for a period of time;
a ceramic glaze with exothermic particle that covers at least a portion of the outer surface of the outer shell in order to absorb microwaves and convert the microwaves to heat;
a thermal insulator with the exothermic particles that covers at least a portion of the outer surface of the outer shell in order to insulate the vessel and to convert the microwaves to heat; and
a pressure release value to release any excess pressure built up in the cavity when the container is heated.

2. The double-layered microwaveable vessel of claim 1, wherein the heat retention medium comprises ambient air or silicone oil.

3. The double-layered microwaveable vessel of claim 1, wherein the heat retention medium comprises a thermal conductive pad or a thermal conductive gel.

4. The double-layered microwaveable vessel of claim 1, wherein the heat retention medium comprises silicone based material with an aluminum oxide compound.

5. The double-layered microwaveable vessel of claim 1, wherein the heat retention medium comprises silicone rubber with ferrite particles.

6. The double-layered microwaveable vessel of claim 1, wherein the thermal insulator comprises a syndiotactic polystyrene (SPS) compound.

7. The double-layered microwaveable vessel of claim 1, wherein the thermal insulator comprises a polyphenylene sulfide (PPS) compound.

8. The double-layered microwaveable vessel of claim 1, wherein at least a portion of the outer surface of the outer shell is covered with a thermochromic paint that changes color when the container is heated.

9. The double-layered microwaveable vessel of claim 1 further comprising a metallic lid to reflect the microwaves.

10. The double-layered microwaveable vessel of claim 9 further comprising a silicone member between the metallic lid and the container to prevent arcing between edges of the metallic lid and the container.

11. The double-layered microwaveable vessel of claim 1 further comprising a piece of ferrite rubber that covers at least a portion of the bottom of the container.

12. The double-layered microwaveable vessel of claim 1, wherein microwavable vessel is a pan, a pot, a bake ware, or a mug.

13. A double-layered microwaveable vessel comprising:
a container having inner and outer shells that are joined to form a cavity between the inner and outer shells;
an enamel glaze with exothermic particles that covers at least a portion of the outer surface of the outer shell in order to absorb microwaves and convert the microwaves to heat; and
a heat retention medium in the cavity between the inner and outer shells to absorb and retain the heat for a period of time;
a thermal insulator with the exothermic particles that covers at least a portion of the outer surface of the outer shell to insulate the vessel and to convert the microwaves to heat; and
a pressure release value to release any excess pressure built up in the cavity when the container is heated.

14. The double-layered microwaveable vessel of claim 13, wherein at a portion of the outer surface of the outer shell is covered by a thermal insulator to insulate the vessel when heated.

15. The double-layered microwaveable vessel of claim 13 further comprising an exothermic plate disposed between the inner and outer shells, and exposed along the bottom side of the outer shell to absorb microwaves and convert the microwaves to heat.

16. The double-layered microwaveable vessel of claim 13, wherein at least a portion of the outer surface of the outer shell is covered with a thermochromic paint that changes color when the container is heated.

17. The double-layered microwaveable vessel of claim 13, wherein the thermal insulator is made with SPS or PPS compound.

* * * * *